United States Patent
Zeng et al.

(10) Patent No.: US 9,892,506 B2
(45) Date of Patent: Feb. 13, 2018

(54) SYSTEMS AND METHODS FOR SHAPE ANALYSIS USING LANDMARK-DRIVEN QUASICONFORMAL MAPPING

(71) Applicant: The Florida International University Board of Trustees, Miami, FL (US)

(72) Inventors: Wei Zeng, Miami, FL (US); Yijun Yang, Shandong (CN)

(73) Assignee: The Florida International University Board of Trustees, Miami, FL (US)

( * ) Notice: Subject to any disclaimer, the term of this patent is extended or adjusted under 35 U.S.C. 154(b) by 270 days.

(21) Appl. No.: 14/723,725

(22) Filed: May 28, 2015

(65) Prior Publication Data
US 2016/0350979 A1 Dec. 1, 2016

(51) Int. Cl.
*G06T 15/30* (2011.01)
*G06T 17/20* (2006.01)
*G06T 7/00* (2017.01)
*G06T 15/04* (2011.01)

(52) U.S. Cl.
CPC ............ *G06T 7/0012* (2013.01); *G06T 15/04* (2013.01); *G06T 2207/30028* (2013.01); *G06T 2215/06* (2013.01); *G06T 2219/2021* (2013.01)

(58) Field of Classification Search
CPC ............................. G06T 7/0012; G06T 15/04
See application file for complete search history.

(56) References Cited

U.S. PATENT DOCUMENTS

| | | | | | |
|---|---|---|---|---|---|
| 5,891,030 | A | * | 4/1999 | Johnson | A61B 6/032 128/920 |
| 6,331,116 | B1 | * | 12/2001 | Kaufman | G06K 9/209 345/418 |
| 6,694,057 | B1 | * | 2/2004 | Miller | G06K 9/6204 345/419 |
| 6,697,538 | B1 | * | 2/2004 | Angenent | G06T 19/00 382/285 |
| 6,869,396 | B2 | * | 3/2005 | Belson | A61B 1/0053 600/145 |
| 7,224,827 | B2 | * | 5/2007 | Acar | G06T 3/40 378/21 |
| 7,300,398 | B2 | * | 11/2007 | Chefd'hotel | G06T 7/38 382/128 |
| 7,343,195 | B2 | * | 3/2008 | Strommer | A61B 5/0066 600/415 |

(Continued)

OTHER PUBLICATIONS

Kapovich, Introduction to Teichmuller Theory, Aug. 31, 2008.*

(Continued)

*Primary Examiner* — Devona E Faulk
*Assistant Examiner* — Charles L Beard
(74) *Attorney, Agent, or Firm* — Saliwanchik, Lloyd & Eisenschenk

(57) ABSTRACT

Methods, systems, and computer-readable media that can perform novel and effective flattening of an image are provided. The flattening can be based on quasiconformal mapping. Such mapping can be used to straighten the main landmark curves with least conformality (angle) distortion. This technique can be referred to as quasiconformal straightening (QCS), and it can provide a canonical and straightforward view of convoluted surfaces. The computation can be based on the holomorphic 1-form method with landmark straightening constraints and quasiconformal optimization.

9 Claims, 15 Drawing Sheets

(56) References Cited

U.S. PATENT DOCUMENTS

| | | | | |
|---|---|---|---|---|
| 7,372,988 B2* | 5/2008 | Yoakum-Stover | G06T 7/0012 | 128/920 |
| 7,457,444 B2* | 11/2008 | Geiger | G06K 9/44 | 128/922 |
| 7,574,032 B2* | 8/2009 | Sirohey | G06T 7/0012 | 382/131 |
| 7,576,738 B2* | 8/2009 | Litke | G06T 17/20 | 345/420 |
| 7,639,855 B2* | 12/2009 | Matsumoto | G06T 7/60 | 382/131 |
| 7,809,177 B2* | 10/2010 | Yoshida | G06K 9/00 | 378/21 |
| 7,825,924 B2* | 11/2010 | Matsumoto | G06T 19/00 | 345/419 |
| 7,839,402 B2* | 11/2010 | Dekel | G06T 15/08 | 345/419 |
| 8,023,710 B2* | 9/2011 | Summers | A61B 5/05 | 382/128 |
| 8,059,877 B2* | 11/2011 | Geiger | G06K 9/44 | 345/418 |
| 8,102,416 B2* | 1/2012 | Ito | A61B 1/05 | 348/65 |
| 8,218,844 B2* | 7/2012 | Mohamed | G06T 7/0012 | 128/922 |
| 8,224,054 B2* | 7/2012 | Sirohey | G06T 7/0012 | 382/131 |
| 8,405,659 B2* | 3/2013 | Lakshmanan | G06T 17/20 | 345/419 |
| 8,600,125 B2* | 12/2013 | Kaufman | G06K 9/342 | 382/128 |
| 8,675,929 B2* | 3/2014 | Sirohey | G06T 7/38 | 382/128 |
| 8,801,601 B2* | 8/2014 | Prisco | A61B 1/00009 | 600/117 |
| 8,817,014 B2* | 8/2014 | Shinagawa | G06T 3/0031 | 345/419 |
| 8,848,295 B2* | 9/2014 | Smith | G02B 3/0087 | 359/652 |
| 8,933,932 B2* | 1/2015 | Huysmans | G06T 17/20 | 345/419 |
| 8,995,736 B2* | 3/2015 | Kaufman | G06T 7/0014 | 382/131 |
| 9,031,362 B2* | 5/2015 | Lipson | G02B 6/125 | 385/130 |
| 9,036,882 B2* | 5/2015 | Masumoto | A61B 5/4255 | 382/128 |
| 9,060,672 B2* | 6/2015 | Brieu | A61B 5/00 | |
| 9,177,378 B2* | 11/2015 | Schoenmeyer | G06T 7/0012 | |
| 9,299,156 B2* | 3/2016 | Zalis | G06F 19/321 | |
| 9,474,582 B2* | 10/2016 | Musuvathy | A61F 2/30942 | |
| 9,547,940 B1* | 1/2017 | Sun | G06T 19/006 | |
| 2003/0132936 A1* | 7/2003 | Kreeger | G06T 7/0012 | 345/420 |
| 2006/0013505 A1* | 1/2006 | Yau | G06K 9/00201 | 382/285 |
| 2006/0058647 A1* | 3/2006 | Strommer | A61B 5/062 | 600/434 |
| 2006/0200798 A1* | 9/2006 | Harrison | G06F 17/10 | 717/108 |
| 2006/0267978 A1* | 11/2006 | Litke | G06T 17/20 | 345/419 |
| 2007/0003131 A1* | 1/2007 | Kaufman | G06T 7/64 | 382/154 |
| 2008/0118135 A1* | 5/2008 | Averbuch | G06T 7/0012 | 382/131 |
| 2009/0161927 A1* | 6/2009 | Mori | A61B 6/466 | 382/128 |
| 2009/0175518 A1* | 7/2009 | Ikuma | A61B 5/06 | 382/128 |
| 2009/0214097 A1* | 8/2009 | Mohamed | G06T 7/0012 | 382/131 |
| 2009/0225077 A1* | 9/2009 | Sudarsky | G06T 7/60 | 345/423 |
| 2010/0214312 A1* | 8/2010 | Weber | G06T 13/80 | 345/593 |
| 2010/0215226 A1* | 8/2010 | Kaufman | G06K 9/342 | 382/128 |
| 2010/0328311 A1* | 12/2010 | Lakshmanan | G06T 17/20 | 345/427 |
| 2012/0120074 A1* | 5/2012 | Huysmans | G06T 17/20 | 345/420 |
| 2013/0170726 A1* | 7/2013 | Kaufman | G06T 3/0068 | 382/131 |
| 2014/0037217 A1* | 2/2014 | Iliopoulos | G06K 9/6232 | 382/201 |
| 2014/0228707 A1* | 8/2014 | Brieu | A61B 5/00 | 600/567 |
| 2014/0324766 A1* | 10/2014 | Alboszta | G06N 99/002 | 706/57 |
| 2014/0325827 A1* | 11/2014 | Lipson | G02B 6/125 | 29/592 |
| 2014/0362080 A1* | 12/2014 | Kaufman | G06T 19/00 | 345/420 |
| 2015/0100289 A1* | 4/2015 | Kimmel | G06K 9/6214 | 703/2 |
| 2015/0230874 A1* | 8/2015 | Musuvathy | A61B 19/50 | 703/1 |
| 2015/0301225 A1* | 10/2015 | Dimitrov | G01V 1/301 | 703/10 |
| 2015/0334276 A1* | 11/2015 | Ecker | A61B 1/00009 | 348/76 |
| 2015/0356704 A1* | 12/2015 | Lipman | G06T 3/0093 | 703/1 |
| 2016/0004972 A1* | 1/2016 | Alboszta | G06N 99/002 | 706/52 |
| 2016/0204515 A1* | 7/2016 | Smith | H01Q 13/28 | 343/772 |
| 2017/0176580 A1* | 6/2017 | Ohtsu | G01S 7/495 | |
| 2017/0212868 A1* | 7/2017 | Huang | G06F 17/16 | |

OTHER PUBLICATIONS

Zeng et al., Supine and Prone Colon Registration Using Quasi-Conformal Mapping, Nov. 2010.*

Gu et al., Genus Zero Surface Conformal Mapping and Its Application to Brain Surface Mapping, Aug. 2004.*

Hong et al., Conformal Virtual Colon Flattening, Jun. 2006.*

Lui et al., Shape Analysis of Planar Multiply-Connected Object Using Conformal Welding, Jul. 2013.*

Sheffer et al., Mesh Parameterization Methods and Their Applications, 2006.*

Zhu, Haustral Fold Segmentation with Curvature-Guided Level set Evolution, Feb. 2013.*

Shi et al., Efficient Colon Wall Flattening by Improved Conformal Mapping Methodologies for Computed Tomography Colonography, 2011.*

Kobayashi et al., Holomorphic Conformal Structures and Uniformization of Complex Surfaces, 1988.*

Kropf et al., Conformal parameterization for multiply connected domains: combining finite elements and complex analysis, 2014.*

Springborn, Boris et al. "Conformal Equivalence of Triangle Meshes," *ACM Transactions on Graphics,* 2008, 27(3): 1-11.

Center, Melissa M. et al. "Worldwide Variations in Colorectal Cancer," *A Cancer Journal for Clinicians,* 59:366-378.

Desbrun, Mathieu et al. "Intrinsic Parameterizations of Surface Meshes," *Eurographics Association and Blackwell Publishers,* 2002, 21(2): 209-218.

Floater, Michael S. et al. "Surface Parameterization: a Tutotorial and Survey," http://sites.fas.harvard.edu/~cs277/handouts/param.pdf.

Funkhouser, Thomas et al. "A Search Engine for 3D Models," *ACM Transactions on Graphics,* 2002, 5(10):1-28.

Frisken Gibson, Sarah F. Constrained Elastic Surface Nets: Generating Smooth Models from Binary Segmented Data, *Mitsubishi Electric Research Models,*1999, 1496:888-898.

(56) References Cited

OTHER PUBLICATIONS

Gu, Xianfeng et al. "Global Conformal Surface Parameterization," *Eurographics Symposium on Geometry Processing*, 2003.
Gu, X. David et al. "Numerical Computation of Surface Conformal Mappings," *Computational Methods and Function Theory*, 2011, 11(2), 747-787.
Haker, Steven, "Nondistorting Flattenng Maps and the 3D Visualization of Colon CT Images," *IEEE*, 2000, 19:665-670.
Hong Lichan et al. "Virtual Voyage: Interactive Navigation in the Human Colon," *Proceedings of SIGGRAPH*, 1997, pp. 27-34.
Hong, Wei, et al. "A Pipeline for Computer Aided Polyp Detection." *IEEE Transactions on Visualization and Computer Graphics*, 2006, 12.5 (2006): 861-8.
Hong, Wei et al. "Conformal Virtual Colon Flattening," *Proceedings of ACM Symposium on Solid and Physical Modeling*, 2006, pp. 85-93.
Jin, Miao, et al. "Computing Teichmuller Shape Space." *IEEE Transactions on Visualization and and Computer Graphics*, 2009, (15)3: 504-517.
Kazhdan, Michael et al. "Rotation Invariant Spherical Harmonic Representation of 3D Shape Descriptors," *Eurographics Symposium on Geometry Processing*, 2003, 156-164.
Kurtek, Sebastian et al. "Landmark-Guided Elastic Shape Analysis of Spherically-Parameterized Surfaces," *Proceedings of Eurographics*, 2013, 32(2): 429-438.
Levy, Bruno, "Least Squares Conformal Maps for Automatic Texture Atlas Generation," *SIGGRAPH*, 2002.
Lui, Lok Ming et al. "Automatic Landmark Tracking and its Application to the Optimization of Brain Conformal Mapping," *Proceedings of the 2006 IEEE Computer Society Conference*, 2006, 1784-1792.
Lui, L.M. et al. "Optimization of Surface Registrations Using Beltrami Holomorphic Flow," *Journal of Scientific Computing*, 2012, 50(3): 557-585.
Lui, L.M. et al. "Convergence of an Iterative Algorithm for Teichmuller Maps Via Harmonic Energy Optimization," 2013, ftp://ftp.math.ucla.edu/pub/camreport/cam13-36.pdf.
Lui, L.M. et al. "Shape Analysis of Planar Multiply-Connected Objects Using Conformal Welding," *IEEE TPAMI*, 2013, 36(7): 1384-1401.
Marino, Joseph et al. "Context Preserving Maps of Tubular Structures," *IEEE TVCG*, 2011, 17(2): 1997-2004.
Qiu, F., et al. "Colon flattening with discrete Ricci flow," In: *MICCAI 2008 workshop Springer, Heidelberg, LNCS*, 2008, 5242: 97-102.
Sharon, E. et al. "2D-Shape Analysis Using Conformal Mapping," *International Journal of Computer Vision*, 2006, 70(1):55-75.
Sheffer, Alla et al. "Mesh Parameterization Methods and Their Applications," *Foundations and Trends in Computer Graphics Vision*, 2006, 2(2):105-171.
Shi, Rui et al. "Hyperbolic Harmonic Mapping for Constrained Brain Surface Registration," *IEEE CVPR*, 2013, 2531-2538.
Weber, Ofir et al. "Computing Extremal Quasiconformal Maps," *Eurographics Symposium on Geometry Processing*, 2012, 31(5): 1679-1689.
Yin, Lijun et al. "A 3D Facial Expression Database for Facial Behavior Research," *IEEE FG'06*, 2006, pp. 211-216.
Zeng et al. "3D Non-rigid Surface Matching and Registration Based on Holomorphic Differentials," *ECCV'08*, 2008.
Zeng et al. "Surface Quasi-Conformal Mapping by Solving Beltrami Equations," *Proccedings of IMA Mathematics of Surfaces XIII*, 2003, pp. 391-408.
Zeng et al. "Ricci Flow for 3D Shape Analysis," *IEEE Transactions on Pattern Analysis and Machine Intelligence*, 2010, 32(4): 662-677.
Zeng et al. "Supine and Prone Colon Registration Using Quasi-Conformal Mapping," *IEEE Transactions on Visualization and Computer Graphics*, 2010, 16(6): 1348-1357.
Zeng et al. "Registration for 3D Surfaces with Large Deformations Using Quasi-Conformal Curvature Flow," *IEEE Transactions on Visualization and Computer Graphics*, 2010, 16(6): 1348-1357.
Zeng et al. "Teichmüller Shape Descriptor and Its Application to Alzheimer's Disease Study," *IJCV*, 2013, 105(2): 155-170.

* cited by examiner

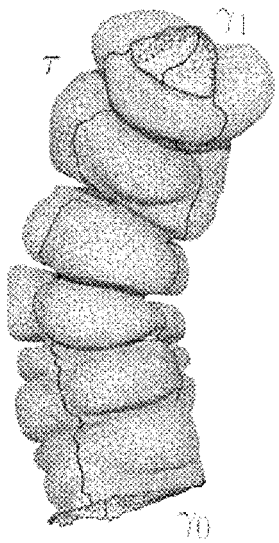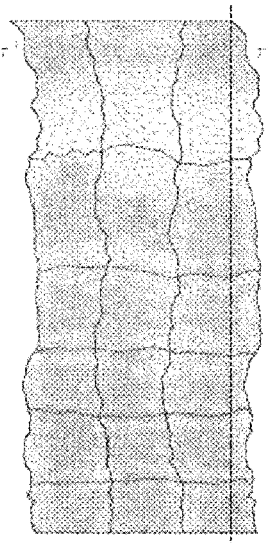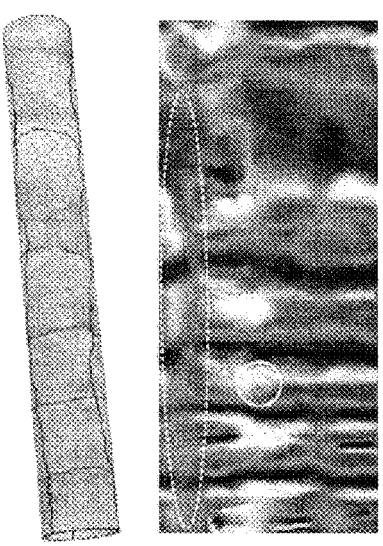
(a) colon - I
FIG. 1A
(b) conformal map
FIG. 1B
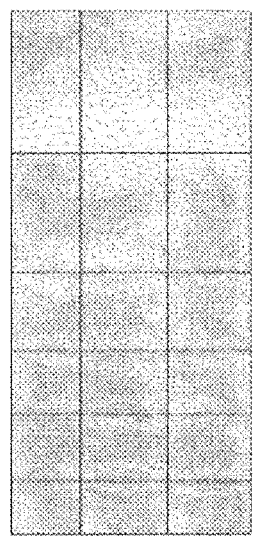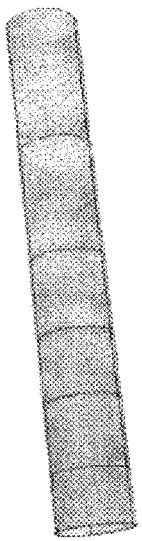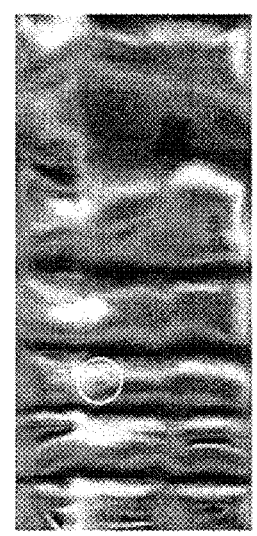
(c) optimal quasiconformal map
FIG. 1C (a) initial $|\mu_0|$    (b) optimal $|\mu_n|$ (a) 3D surface (b) conformal map (c) canonical quasiconformal map (a) quadrilateral domain (b) doubly-connected domain (a) conformal map (inner radius $r_1 = 0.057$)

(b) quasiconformal map (inner radius $r_1 = 0.068$)

 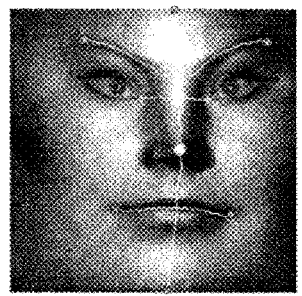 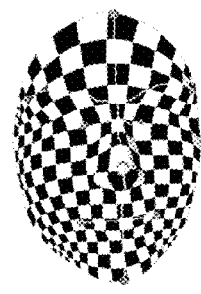
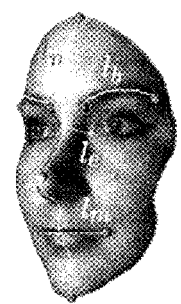 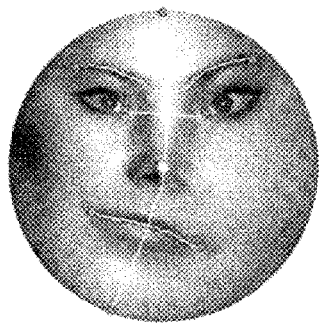 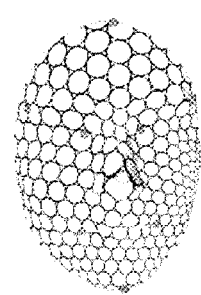
(a) 3D face     (b) C-map    tex-map
FIG. 7A           FIG. 7B

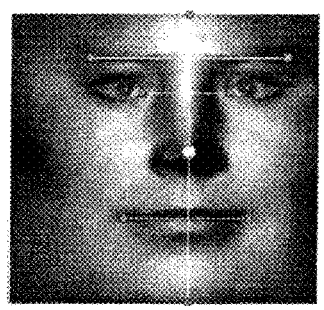
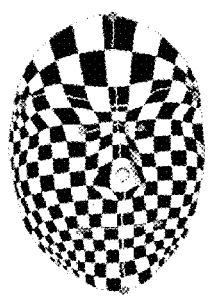
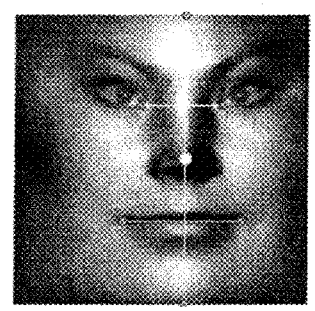
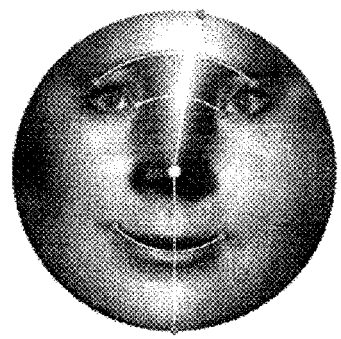
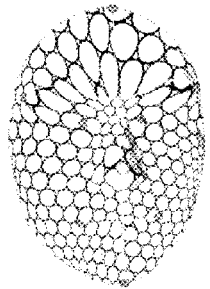
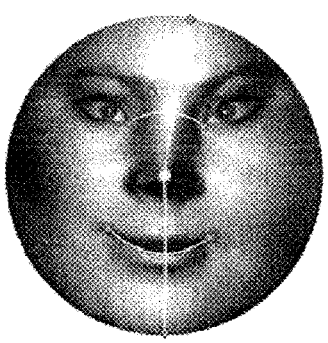
(c) QC-map    tex-map    (d) another case
FIG. 7C           FIG. 7D

  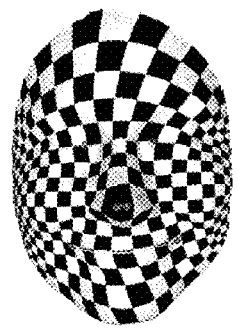
(a) $S_1$  (b) $S_2$  (c) QC-registration
FIG. 10A  FIG. 10B  FIG. 10C
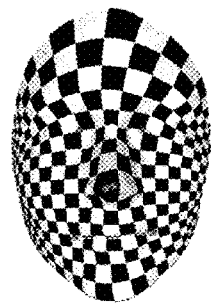 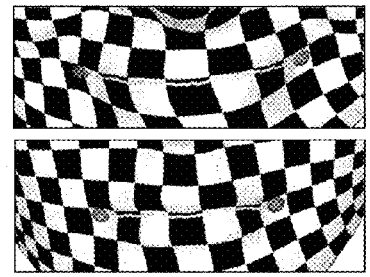
(d) C-map  (e) close-up view
FIG. 10D  FIG. 10E (a) curve constraint (b) point constraints

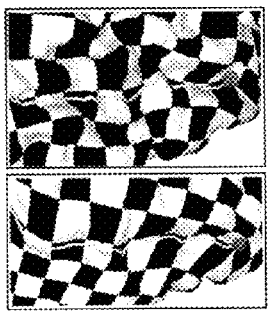
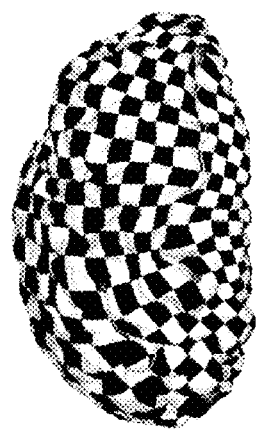
(a) $S_1$
FIG. 12A
(b) $S_2$
FIG. 12B
(c) QC-registration
FIG. 12C
(d) C-map
FIG. 12D
(e) close-up view
FIG. 12E

SYSTEMS AND METHODS FOR SHAPE ANALYSIS USING LANDMARK-DRIVEN QUASICONFORMAL MAPPING

BACKGROUND OF INVENTION

Colorectal cancer is the third-most commonly diagnosed cancer in the world. Conventional optical colonoscopy (OC) is used for screening precancerous polyps, but it requires an invasive operation and can cause harm and pain to patients. Virtual colonoscopy (VC), also called computerized tomography (CT) colonography provides a more comfortable and non invasive alternative diagnosis tool. VC requires extraction of a 3D colon inner wall surface from CT scans of the abdomen, followed by a radiologist "flying" through the virtual 3D colon tunnel to locate precancerous polyps and cancer. The colon is a long and convoluted tube structure, so VC can be time-consuming and is difficult to perform if the colon is occluded.

Additionally, in general computer vision, efficient shape representations for surfaces can be used to effectively deal with shape analysis problems, such as shape indexing, matching, recognition, classification, and registration. Canonical surface mappings such as conformal mappings, provide shape representations with good properties, which are global and intrinsic and have the guarantee of existence and uniqueness.

In the past decade, much research has focused on conformal mapping methods, including least square conformal maps, differential forms, and discrete curvature flows. The surface uniformization theorem states that any arbitrary surface can be conformally mapped to one of three canonical spaces: the unit sphere; the Euclidean plane; or the hyperbolic disk.

BRIEF SUMMARY

Embodiments of the subject invention provide methods, systems, and computer readable media that can perform novel and effective flattening (e.g., colon flattening) based on quasiconformal mapping. Such mapping can be used to straighten the main anatomical landmark curves with least conformality (angle) distortion. This technique can be referred to as quasiconformal straightening (QCS), and it can provide a canonical and straightforward view of convoluted surfaces, such as the long, convoluted, and folded tubular surface of a colon. The computation can be based on the holomorphic 1-form method with landmark straightening constraints and quasiconformal optimization, and can have linear time complexity due to the linearity of 1-forms in each iteration. Straightened quasiconformal maps of the subject invention can provide well-structured views, representing both local and global geometric structures, which are more accessible for reading or automatic screening than conformal views with broken features. Systems and methods of the subject invention have great potential for feature-aware visualization, matching, precise curve-constrained registration, and shape analysis, including but not limited to 3D colon straightening, supine-prone colon registration, and other medical tasks where landmark curves are naturally associated.

Embodiments of the subject invention also provide systems, methods, and computer readable media that can perform quasiconformal mappings for surfaces decorated with landmark curves. The angle distortion (quasiconformality) can be implied by the landmark curve straightening constraints. Such mappings can be considered a special category and can be canonical and intrinsic. A novel type of shape representation can be achieved, which encodes the landmark curves' geometry and their relation to background surface context, and provides a global and intrinsic shape signature to classify surfaces in shape space. The shape signature can be invariant if the surface encounters a conformal transformation (conformal invariant). Using this as the Teichmüller coordinates, a landmark-driven Teichmüller space can be constructed, which is a subspace of the conventional Teichmüller space, constrained by the landmark curves. This canonical shape representation can then be applied for matching and registration purposes for the case of landmark curve decorated surfaces.

In an embodiment, a method for producing a flattened map of an image can include: receiving data for a three-dimensional surface of the image; computing a quasi-holomorphic 1-form of the surface; integrating the quasi-holomorphic 1-form to obtain quasiconformal mapping of the surface; and obtaining the flattened map from the quasiconformal mapping. Obtaining the flattened map from the quasiconformal mapping can include optimizing the quasiconformal mapping to obtain the flattened map, though embodiments are not limited thereto. In a particular embodiment, the surface can include at least one landmark curve, and the method can further include converting the at least one landmark curve in preparation for computation of the quasi-holomorphic 1-form.

In another embodiment, a computer-readable medium can have computer-executable instructions for performing a method for producing a flattened map of an image, and the method can include: receiving data for a three-dimensional surface of the image; computing a quasi-holomorphic 1-form of the surface; integrating the quasi-holomorphic 1-form to obtain quasiconformal mapping of the surface; and optimizing the quasiconformal mapping to obtain the flattened map.

In yet another embodiment, a computer-readable medium can have computer-executable instructions for performing a method for producing a flattened map of an image, and the method can include: receiving data for a three-dimensional surface of the image, wherein the surface comprises at least one landmark curve; converting the at least one landmark curve in preparation for computation of the quasi-holomorphic 1-form; computing the quasi-holomorphic 1-form of the surface; integrating the quasi-holomorphic 1-form to obtain quasiconformal mapping of the surface; and obtaining the flattened map from the quasiconformal mapping.

In another embodiment, a method for producing registration between two surfaces, wherein the two surfaces $S_k$ are decorated with landmark curves $L_k$, k=1,2, respectively, $f: (S_1, L_1) \to (S_2, L_2)$, based on flattened maps $\varphi_k: (S_k, L_k) \to (D_k, l_k)$, can include converting the curve constraints to linear constraints. The method can include: computing the two flattened maps $\varphi_k: (S_k, L_k) \to (D_k, l_k)$; computing the optimal mapping h: $(D_1, l_1) \to (D_2, l_2)$, such that straight line $l_1$ is aligned with straight line $l_2$ and the harmonic energy of the mapping, $E(h) = \int_{D_1} |\nabla \cdot \nabla h|^2 dA$ with the Dirichlet and Neumann boundary conditions, is minimized, $$\begin{cases} \Delta h_1 = 0 \\ h_1 |_{\gamma_3^1} = \phi_2^u |_{\gamma_3^2} - \phi_1^u |_{\gamma_3^1} \\ h_1 |_{\gamma_1^1} = \phi_2^u |_{\gamma_1^2} - \phi_1^u |_{\gamma_1^1} \\ \frac{\partial h_1}{\partial n} \Big|_{\gamma_0 \cup \gamma_2} = 0 \\ h_1 |_{l^V} = \phi_2^u |_{l^V} - \phi_1^u |_{l^V} \\ h_1 |_{P_1^H} = \phi_2^u |_{P_2^H} - \phi_1^u |_{P_1^H} \end{cases} \text{ and } \begin{cases} \Delta h_2 = 0 \\ h_2 |_{\gamma_0^1} = \phi_2^v |_{\gamma_0^2} - \phi_1^v |_{\gamma_0^1} \\ h_2 |_{\gamma_2^1} = \phi_2^v |_{\gamma_2^2} - \phi_1^v |_{\gamma_2^1} \\ \frac{\partial h_2}{\partial n} \Big|_{\gamma_1 \cup \gamma_3} = 0 \\ h_2 |_{l^H} = \phi_2^v |_{l^H} - \phi_1^v |_{l^H} \\ h_2 |_{P_1^V} = \phi_2^v |_{P_2^V} - \phi_1^v |_{P_1^V} \end{cases}$$

wherein $\nabla h = (h_1, h_2)$, suppose $D_k$ are rectangles, $\partial D_k = \gamma_0^k + \gamma_1^k + \gamma_2^k + \gamma_3^k$, $(\gamma_i^1, \gamma_i^2)$, i=0 . . . 3 denotes a pair of corresponding boundaries, $L_k = L_k^H \cap L_k^V$, $(l_1, l_2)$ and $(p_1, p_2)$ can be used to denote a pair of segments and endpoints to be aligned, respectively, and then $h(p)=p+\nabla h(p)$, $p \in D_1$; and obtaining the registration $f = \varphi_2^{-1} \circ h \circ \varphi_1$. In a further embodiment, a computer-readable medium can have computer-executable instructions for performing the method for producing registration between two surfaces.

BRIEF DESCRIPTION OF THE DRAWINGS

FIG. 1A shows an image of a colon
FIG. 1B shows conformal maps of the colon of FIG. 1A.
FIG. 1C shows quasiconformal maps of the colon of FIG. 1A.
FIG. 7A shows images of a face.
FIG. 7B shows conformal maps and texture mapping results of the faces of FIG. 7A.
FIG. 7C shows canonical quasiconformal maps and texture mapping results of the faces of FIG. 7A.
FIG. 7D shows canonical quasiconformal maps and texture mapping results of faces.
FIG. 10A shows an image of a face of a subject.
FIG. 10B shows an image of a face of the subject of FIG. 10A.
FIG. 10C shows a quasiconformal registration image of the subject in FIG. 10A.
FIG. 10D shows a conformal map of the subject in FIG. 10A.
FIG. 10E shows a close-up view of FIGS. 10C and 10D.
FIG. 12A shows an image of a brain surface.
FIG. 12B shows an image of a brain surface.
FIG. 12C shows a quasiconformal registration of the brain surface of FIG. 12A.
FIG. 12D shows a conformal map of the brain surface of FIG. 12B.
FIG. 12E shows a close-up view of FIGS. 12C and 12D.

DETAILED DISCLOSURE

Figure 2A:
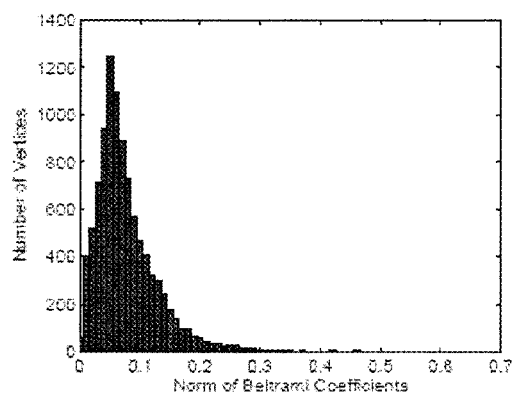
FIG. 2A shows a plot of the initial distortion.

Embodiments of the subject invention provide methods, systems, and computer readable media that can perform novel and effective flattening (e.g., colon flattening) based on quasiconformal mapping. Such mapping can be used to straighten the main anatomical landmark curves with least conformality (angle) distortion. This technique can be referred to as quasiconformal straightening (QCS), and it can provide a canonical and straightforward view of convoluted surfaces, such as the long, convoluted, and folded tubular surface of a colon. The computation can be based on the holomorphic 1-form method with landmark straightening constraints and quasiconformal optimization, and can have linear time complexity due to the linearity of 1-forms in each iteration. Straightened quasiconformal maps of the subject invention can provide well-structured views, representing both local and global geometric structures, which are more accessible for reading or automatic screening than conformal views with broken features. Systems and methods of the subject invention have great potential for feature-aware visualization, matching, precise curve-constrained registration, and shape analysis, including but not limited to 3D colon straightening, supine-prone colon registration, and other medical tasks where landmark curves are naturally associated.

Embodiments of the subject invention can be used to visually flatten colon surfaces while straightening taeniae coli and flexures with least angle distortion guarantee through a canonical quasiconformal mapping. In contrast to related art conformal colon flattening works, the present method can provide uniformization to both surface and decorative landmark geometries. A unique and intrinsic parameter domain can be generated for straightening.

Embodiments of the subject invention also provide systems, methods, and computer readable media that can perform quasiconformal mappings for landmark curve decorated surfaces. The angle distortion (quasiconformality) can be implied by the landmark curve straightening constraints. Such mappings can be considered a special category and can be canonical and intrinsic. A novel type of shape representation can be achieved, which encodes the landmark curves' geometry and their relation to background surface context, and provides a global and intrinsic shape signature to classify surfaces in shape space. The shape signature can be invariant if the surface encounters a conformal transformation (conformal invariant). Using this as the Teichmüller coordinates, a landmark-driven Teichmüller space can be constructed, which is a subspace of the conventional Teichmüller space, constrained by the landmark curves. This canonical shape representation can then be applied for matching and registration purposes for the case of landmark curve decorated surfaces.

Landmark curve-driven canonical quasiconformal maps can be computed, and the canonical shape representation can be used for landmark curve-decorated surface matching and registration. Compared with related art conformal maps of pure surfaces, the generated intrinsic canonical quasiconformal map studies the nature of curves in a surface and the influence to conformal structure, and provides the feature-aware shape signature and global representation. Landmark geometry can be encoded, enabling the subject invention to be more capable of representing a shape both globally and locally and allowing the subject invention to be used to differentiate topological disk surfaces. Potential applications include, but are not limited to, artwork design, large-scale shape retrieval in industry, medical imaging, brain morphology studies, facial expression analysis, supine-prone colon registration, and animation (e.g., in the graphics industry).

Colon flattening can generate a global and complete visualization of the entire colon wall, where the convoluted and folded surface are flattened onto a planar domain. Using such mapping, geometric and intensity information of the original 3D surface can be fully exposed on the 2D domain. Therefore, polyps and abnormalities can be efficiently identified with, for example, computer-aided detection (CAD) techniques on the 2D flattened view and easily located on 3D endoluminal views from the mapping. One type of mapping is conformal mapping (C-map), which preserves angles (local shapes) and therefore is highly desired for morphometry-based medical diagnosis. Colon conformal flattening methods include Laplace-Beltrami operator, holomorphic 1-form, and curvature flow. In addition, a curved 2D flattening view based on one or more harmonic maps can be used.

In medical imaging, biomarkers or anatomical landmarks are commonly used to assist shape analysis and abnormality diagnosis. Significant anatomical landmarks of colon surfaces include taeniae coli (three bands of longitudinal muscles which run from the caecum to the rectum, located between latitudinal haustral folds) and flexures (sharp bends of the colon, connecting two components); haustral folds can also be helpful. These landmarks can appear as irregular or broken curves on a 2D rectangle conformal view, as illustrated in FIG. 1B, which shows three images of a conformal map of a colon. This can decrease the efficiency of polyp or tumor screening.

Embodiments of the subject invention include systems, methods, and computer readable media capable of performing colon flattening methods using the insight from quasi-conformal geometry. The flattening can be formulated as a quasiconformal (QC) mapping. In an embodiment, taeniae coli and flexures (and/or haustral folds) can be mapped to vertical and horizontal straight lines on a rectangle. These landmarks characterize the primary anatomical geometry of a colon surface. With them, straightened QC mapping can provide a well-structured view, representing both local and global geometric structures, which is more accessible for reading or automatic screening than conformal views with broken features.

Figure 2B:
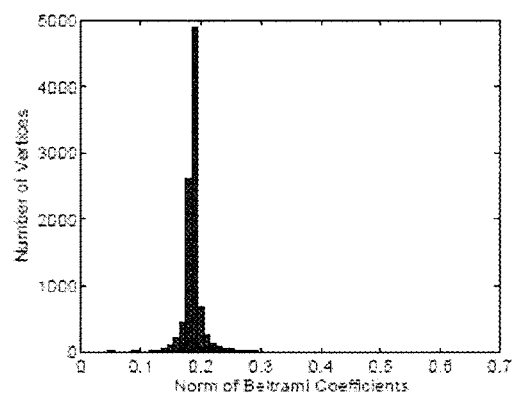
FIG. 2B shows a plot of the optimal distortion.

FIG. 1C shows three images of canonical quasiconformal mapping. Referring to FIG. 1C, the left-most image shows mapping to vertical and horizontal straight lines on a rectangle. According to embodiments of the subject invention, distortion of conformality can be reduced and/or minimized. FIG. 2A shows initial conformality distortion, and FIG. 2B shows conformality distortion after performing a method of the subject invention. Referring to FIGS. 2A and 2B, a large reduction in conformality distortion can be seen.

In an embodiment, QC mapping is obtained by adapting the holomorphic 1-form with landmark straightening constraints to be a unique and optimal quasi-holomorphic 1-form. The quasi-holomorphic 1-form can be formulated as a pair of conjugate differential 1-forms, where each is a harmonic 1-form plus an exact 1-form, and can be based on the Hodge decomposition theorem (see also Farkas et al., Riemann Surfaces, which is hereby incorporated by reference in its entirety). The quasi-holomorphic 1-form can be computed through harmonic energy minimization with the given landmark straightening constraints. The integration of this 1-form can give a QC mapping associated with a Beltrami coefficient $\mu$. Followed by an iterative harmonic QC optimization process, the value of max $|\mu|$ can be minimized (or in certain situations, reduced). The final optimal map gives the intrinsic and unique structure of the surface paired with its landmarks. This technique can be referred to as quasiconformal straightening (QCS), and it can be useful for feature-aware visualization, matching, registration, and shape analysis.

Many embodiments of the subject invention can include performing an algorithm for QC mapping. Based on an algorithm of the subject invention, a straightforward canonical view can be obtained for convoluted surfaces, such as the long, convoluted, and folded tubular colon surface. A pull-back metric can be used to describe the variation of conformal structures of decorated surface (S, L) (L is a set of landmark curves) from pure surface S, using the conformal module of the 2D rectangle domain, Mod=h/w, the ratio of height h and width w, which is a conformal invariant. In FIGS. 1A-1C, Mod(S)=2.32, Mod(S, L)=2.18. The new canonical shape representation can reveal the characteristics of the anatomical landmark curves with respect to the whole surface geometry. QCS techniques of the subject invention can be based on 1-form methods, can have linear time complexity, and can be robust to topology and geometry noises. Such techniques can handle multiple and complicated landmark curves, and can be general for surfaces with more complicated topologies.

A holomorphic 1-form on a Riemann surface S is an assignment of a holomorphic function $\varphi_i(z_i)$ on each chart $z_j$ such that if $z_i$ is another local coordinate, then $$\phi_i(z_i) = \phi_j(z_j)\left(\frac{dz_j}{dz_i}\right).$$

It has the representation $\omega = \tau + \sqrt{-1}*\tau$, where $\tau$ is a harmonic 1-form, $\tau = df$, $\Delta f = 0$ ($f$ is a harmonic function). The Laplacian Beltrami operator $\Delta = d\delta + \delta d$, where d is the exterior derivative, and $\delta$ is the codifferential. In each cohomology class, there exists a unique harmonic 1-form. Hodge decomposition theorem says that any 1-form $\omega$ can be decomposed to three forms: an exact form $d\alpha$; a closed form $\delta\beta$; and a harmonic form $\gamma$, where $\alpha$ is a 0-form. Adapting the unique harmonic 1-form by an exact 1-form results in a new differential 1-form.

Suppose $f: (S_1, g_1) \rightarrow (S_2, g_2)$ is a differential mapping between two Riemann surfaces, $S_1$, $S_2$, with Riemannian metric $g_1$, $g_2$, respectively. Such a mapping can be referred to as a conformal mapping if its local representation $w(z)$ satisfies $\partial_{\bar{z}} w = 0$ everywhere. The complex differential operators are defined as $$\partial_z = \frac{1}{2}(\partial_x - i\partial_y) \text{ and } \partial_{\bar{z}} = \frac{1}{2}(\partial_x + i\partial_y).$$

In general, the mapping $f$ satisfies the Beltrami equation, $$\partial_{\bar{z}} f = \mu_f(z) \partial_z f \qquad (1)$$

where $\mu$ is called the Beltrami coefficient, $\|\mu\|_\infty < 1$. If $\mu = 0$, then $f$ is a holomorphic function, which preserves angles and is conformal. If $\|\mu\|_\infty < k$, then $f$ can be referred to as a quasiconformal mapping with bounded angle distortion, which is uniquely determined by its $\mu$, and vice versa.

In an embodiment, an algorithm can be used to compute the unique and optimal quasiconformal mapping with landmark straightening constraints for a surface, such as a tubular colon surface. In a particular embodiment, the computational pipeline of the algorithm can include performing Steps 1-4 as follows.

Step 1 can be termed "slice surface open" and can include puncturing a small hole at each end such that the object to be mapped (e.g., a colon) becomes a topological sphere with two boundaries (e.g., a topological cylinder). The surface can be represented by a triangular mesh, denoted as M=(V, E,F), where V, E, F are vertex, edge, and face sets respectively; the boundary is $\partial_m = \gamma_0 - \gamma_1$, where $\gamma_0, \gamma_1$ denote the exterior and interior boundaries respectively; a set of landmark curves on M is denoted as $L = L^H \cup L^V$, where landmarks in $L^H$ are mapped to horizontal segments, and landmarks in $L^V$ are mapped to vertical segments. The surface of the object to be mapped (e.g., the colon) can be sliced open by the shortest path T connecting two boundaries. The surface (e.g., colon surface) becomes a topological quadrilateral M', where $\tau$ is split into two opposite boundary segments $\tau^+, \tau^-$, as shown in FIG. 1A.

Step 2 of the algorithm can be termed "compute quasi-holomorphic 1-forms". The mapping can be assumed to be $f: (M, L) \to (D, l)$, D has local coordinates (u, v). The sub-algorithm of Step 2 can be as shown in the numbered items as follows.

1. Compute two constrained harmonic functions $f_1, f_2$, $$\begin{cases} \Delta f_1 = 0 \\ f_1|_{\tau^+} = 0 \\ f_1|_{\tau^-} = 1 \\ \frac{\partial f_1}{\partial n}\Big|_{\gamma_0 \cup \gamma_1} = 0 \\ f_1|_{l_j} = t_j, l_j \in L^V \end{cases} \text{ and } \begin{cases} \Delta f_2 = 0 \\ f_2|_{\gamma_0} = 0 \\ f_2|_{\gamma_1} = 1 \\ f_2|_{l_i} = s_i, l_i \in L^H \end{cases} \quad (2)$$

where n is the normal vector to the boundary, and $s_i, t_j$ are unknown variables, computed automatically. Landmark curve, $l_k = [v_1, v_2, \ldots, v_{n_k}]$, has two types of straightening constraints, as follows:

Horizontal: v coordinates are same, $v(v_1) = v(v_2) = \ldots = v(v_{m_i}) = s_i$.

Vertical: u coordinates are same, $u(v_1) = u(v_2) = \ldots = u(v_{n_j}) = t_j$.

The Laplace-Beltrami operator $\Delta$ can be approximated by cotangent edge weight, $\Delta f(v_i) = \Sigma_{[v_i, v_j] \in E} w_{ij}(f(v_i) - f(v_j))$, where $$w_{ij} = \frac{1}{2}(\cot\theta_{ij}^k + \cot\theta_{ij}^l),$$

$[v_i, v_j] \notin \partial M$;

$$w_{ij} = \frac{1}{2}\cot\theta_{ij}^k,$$

$[v_i, v_j] \in \partial M$; $\theta_{ij}^k, \theta_{ij}^l$ are the angles against edge $[v_i, v_j]$.

2. Compute harmonic 1-forms by gradient computation, $\tau_1 = \nabla f_1, \tau_2 = \nabla f_2$.

3. Compute conjugate 1-form of $\tau_1$ by Hodge star operator, $*\tau_1 = \lambda \tau_2$ ($\lambda$ is a scalar), by minimizing the energy $E(\lambda) = \Sigma_{[v_i, v_j, v_k] \in F} |\nabla f_2 - \lambda n \times \nabla f_1|^2 A_{ijk}$, where $A_{ijk}$ is the area of face $[v_i, v_j, v_k]$, n is the normal vector to the face.

4. Compute $\omega = \tau_1 + \sqrt{-1} * \tau_1$.

Step 3 can be termed "compute quasiconformal mapping" and can include generating the quasiconformal mapping by integrating the obtained quasi-holomorphic 1-form $\omega$ over the open domain M', $f(p) = \int_{\gamma(q,p) \in M'} \omega$, $\forall p \in V$, where $\gamma(q, p)$ is an arbitrary path from the base vertex q to the current vertex p. On the planar domain, $f(q) = (0, 0)$, $f(\gamma_i), f(l_k)$ are all straight lines. The rectangle map can be obtained by tracing a straight line perpendicular to boundaries $f(\gamma_i)$. The equation $f_0 = f$ can be set.

Step 4 can be termed "optimize quasiconformal mapping". The process for Step 4 can include the steps shown in the numbered items as follows.

1. Compute the initial Beltrami coefficient $\mu_0 = \mu(f_0)$ using Equation (1).

2. Repeat the following steps 2a and 2b: 2a) Optimization: Diffuse $\mu_{n+1} \leftarrow \mu_n + \delta \Delta \mu_n$; and 2b) Projection, which includes i) through iii): i) Compute the intermediate quasiconformal map associated with $\mu_n$, $f^{\mu_n}: (D, z) \to (D^{\mu_n}, \xi)$; ii) Compute the quasiconformal map $h^{\mu_n}: (D^{\mu_n}, L) \to (D, l)$ by Steps 2-3; and iii) Update $\mu_{n+1} \leftarrow \mu(h^{\mu_n} \circ f^{\mu_n})$, intil $\|\mu_{n+1} - \mu_n\|_\infty < \epsilon$.

3. The desired mapping $f = h^{\mu_n} \circ f^{\mu_n} \circ f_0$.

The solution of the quasiconformal optimization process converges to the extremal QC map; the resulted map is unique and optimal (with least conformality distortion $|\mu|$); this can be proven by the method of Lui et al. (Lui et al., Convergence of an iterative algorithm for Teichmüller maps via harmonic energy optimization, 2013, which is hereby incorporated by reference in its entirety). FIG. 2A shows the initial distribution of $|\mu|$ obtained in Step 3; referring to FIG. 2A the initial distribution is scattered, where large distortions are near landmark curves. The harmonic energy sequence of the maps $\{E(h^{\mu_n})\}$ and max $|\mu|$ in Step 4 monotonically decreases and converges; thus, the final $|\mu|$ is the least and becomes uniform. FIG. 2B shows the optimal $|\mu_n|$ with $\epsilon = 1e-5$. The resulted map avoids local significantly distorted areas which may contain polyps. The 1-form algorithm solves sparse linear systems and has linear time complexity in each iteration. More computational details can be found in, for example, Gu et al., Hong et al., and Zeng et al. (Gu et al., Global conformal parameterization, 2003; Hong et al., Conformal virtual colon flattening, 2006; and Zeng et al., Surface quasiconformal mapping by solving Beltrami equations, 2009; each of which is hereby incorporated by reference in its entirety).

In many embodiments of the subject invention, the 1-form method solves positive definite sparse linear systems, and therefore has linear time complexity and is robust to topological and geometric noises. The algorithm is easy to implement, efficient to compute, and robust and stable to handle multiple and complicated decorative landmark curves. The landmark curve-driven quasiconformal straightening techniques of the subject invention can be incorporated into the holomorphic 1-form computation for general topological surfaces.

Embodiments of the subject invention can advantageously flatten colon surfaces while straightening taeniae coli and flexures with least angle distortion guarantee through canonical quasiconformal mapping techniques. In contrast to related art conformal colon flattening works, uniformization can be provided to both surface and decorative landmark geometries. For straightening purposes, registration methods may work but require a manually prescribed target domain; methods of the subject invention can automatically generate a unique and intrinsic parameter domain. The straightened map has great potential for feature-aware shape analysis and precise curve-constrained surface registration, such as supine-prone colon registration, 3D colon straightening, and other medical tasks where landmark curves are naturally associated.

Novel and rigorous colon flattening method are provided herein, which can straighten anatomical landmark curves (e.g., taeniae coli, flexures, and haustral folds) with least angle distortion. Algorithms of the subject invention can generate a unique optimal quasiconformal map for a surface decorated with landmark curves based on the holomorphic 1-form method with landmark constraints and a quasiconformal optimization process. Such a technique can determine the characteristics of landmark curves and the influence to conformal structure while revealing the canonical structures of convoluted colons. Algorithms of the subject invention are efficient and effective and can be used for, e.g., colon polyp and abnormality screening. Algorithms of the subject invention are stable and general, and can have broad impacts on shape analysis of many structures including tubular anatomical structures, such as colons, though embodiments are not limited thereto.

In certain embodiments of the subject invention, quasiconformal mappings for surface decorated landmark curves, whose angle distortion (quasiconformality) is implied by the landmark curve straightening constraints, can be used. Such mappings can be considered a special category and can be canonical and intrinsic. A novel type of shape representation can be achieved, which encodes the landmark curves' geometry and their relation to background surface context, and provides a global and intrinsic shape signature to classify surfaces in shape space. The shape signature can be invariant if the surface encounters a conformal transformation (conformal invariant). Using this as the Teichmüller coordinates, a landmark-driven Teichmüller space can be constructed, which is a subspace of the conventional Teichmüller space, constrained by the landmark curves. This canonical shape representation can then be applied for matching and registration purposes for the case of landmark curve decorated surfaces.

In practice, features on surfaces are preferred for surface matching and registration purposes. Such features usually include feature points, landmark curves, or regions of interest. For example, in medical applications, anatomical landmarks can be used in computer-aided diagnosis and tumor or abnormality detection, such as sulci and gyri curves in brain mapping and facial symmetry curves in adolescent idiopathic scoliosis (AIS) and autism diagnosis. These landmarks can be manually labeled by doctors or automatically extracted. Conformal mapping can be computed for pure surfaces without any interior constraints.

Surfaces to be registered can be first mapped to 2D canonical domains conformally and then a mapping over them can be built with feature constraints. In order to handle landmark curve constraints, a surface along them can be sliced open, and then they can be mapped to boundaries of canonical domain by hyperbolic metric, but it is highly nonlinear (see, e.g., Shi et al., Hyperbolic harmonic mapping for constrained brain surface registration, 2013, which is hereby incorporated by reference in its entirety).

Figure 14:
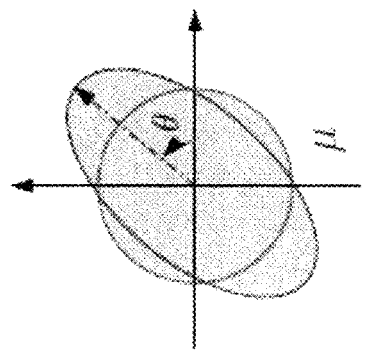
FIG. 14 shows a graphic representation of mapping ellipses to circles.

In general, surface mapping introduces angle and/or area distortions. If angle distortion is reduced to the limit (zero), then the mapping can be referred to as conformal. If the angle distortion is bounded, then the mapping can be referred to as quasiconformal. Geometrically, conformal mapping maps infinitesimal circles to circles, while quasiconformal mapping can map infinitesimal ellipses to circles. FIG. 14 shows a simplistic graphical representation of such mapping. The distortion from ellipse to circle is encoded into the Beltrami coefficient, denoted as $\mu$, which is complex-valued. A conformal mapping has zero $\mu$ everywhere. A quasiconformal mapping corresponds to a $\mu$ (e.g., a nonzero $\mu$), and a $\mu$ can determine a quasiconformal mapping uniquely up to a Möbius transformation. In practice, it can sometimes be difficult to prescribe $\mu$ for a desired mapping; however, target canonical shapes can be set for landmark curves (straight lines or circular arcs/loops).

Figure 4A:
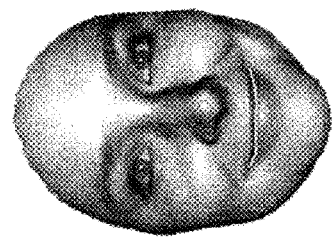
FIG. 4A shows an image of a face.
Figure 4B:
FIG. 4B shows a conformal map of the face of FIG. 4A.
Figure 4C:
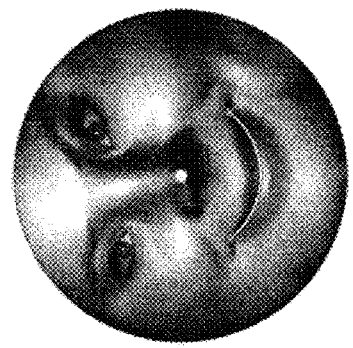
FIG. 4C shows a canonical quasiconformal map of the face of FIG. 4A.

FIG. 4A shows a 3D surface of a face; FIG. 4B shows a conformal map of the face of FIG. 4A; and FIG. 4C shows a canonical quasiconformal map of the face of FIG. 4A. Referring to FIGS. 4A-4C, in certain embodiments of the subject invention, landmark straightening constraints can be used to adapt surface conformal structure, such that the resulting quasiconformal mapping preserves the local shapes as much as possible. This mapping is intrinsic to surface and landmark geometry and can reveal the characteristics of landmark curves.

The landmark-driven canonical forms of the subject invention can lead to efficient and effective matching and registration of surfaces decorated with landmark curve cases and can provide global shape signatures by combining the conformal module of the background domain and the configuration of the canonically mapped landmark curves; they can also be used to construct a Teichmüller space, which considers more dimensional information (surface features) in addition to the surface itself. For example, conformal mapping cannot differentiate topological disk surfaces, because they share the same conformal structure. If the landmark curve constraints are considered, then the topological disks can be compared using the locations and sizes of the straightened landmark curves on the canonical domain. Canonical quasiconformal mapping according to embodiments of the subject invention can provide an approach to introducing the landmark curve constraints to registration processes in a linear way, which is efficient. Landmark curves can be dealt with together with surface, without changing topology. Mapping of the subject invention can be linear and easy to compute, as well as fundamental and with a broad range of real applications with landmark curve constraints in both engineering and medicine.

The surface conformal mapping framework can be generalized to compute surface quasiconformal mappings by an auxiliary metric or holomorphic Beltrami flow, with a given Beltrami coefficient $\mu$. In many embodiments of the subject invention, QC mapping can be performed without having $\mu$ as input; instead $\mu$ can be induced by the landmark constraints intrinsically.

Feature landmarks, such as feature points, can be applied to adapt conformal mapping to be quasiconformal mapping such that the points are aligned to the prescribed targets and used for surface registration. According to embodiments of the subject invention, landmarks can be focused on, and their mapping positions do not need to be prescribed but can be computed automatically; thus, the mapping can be intrinsic to surface and landmark curve geometry.

Teichmüller space studies conformal equivalence class of surfaces and can have uses for shape indexing, dynamics analysis, and morphology analysis. Classical geodesic length spectrum for high genus surfaces and conformal module for genus zero surfaces with boundaries describe surface conformal structure directly. Conformal welding signatures for 2D shapes and for 3D shapes can describe correlation among non-intersecting contours on a surface through conformal structures of surface components surrounded by contours. Landmark-driven canonical quasiconformal mapping according to embodiments of the subject invention can give novel Teichmüller coordinates, which describe correlation among open curve(s) and non-trivial loop(s) on a surface through one single quasiconformal structure. In many embodiments, each landmark has no self-intersection; "horizontal" landmarks may only intersect "vertical" landmarks, and vice versa. Such a signature is conformal invariant and intrinsic to surface and landmark geometry.

A genus zero surface with landmark curves can be mapped to a canonical parameter domain D(u,v) such that each landmark curve is mapped to a straight segment parallel to u-axis (horizontally) or v-axis (vertically), while the local shapes are preserved as much as possible. The computational strategy can include incorporating landmark straightening conditions into the computation of conformal mapping based on the holomorphic 1-form method. Mathematically, this problem can be formulated as solving a sparse linear system with boundary conditions. According to the Hodge decomposition theorem, any differential 1-form can be composed of a closed 1-form, an exact 1-form, and a harmonic 1-form (Farkas et al, supra.). A conformal mapping can be generated by integrating a holomorphic 1-form of the surface. Correspondingly, a quasiconformal mapping can be induced by a harmonic 1-form, plus an exact 1-form which is also closed. A special exact 1-form can be computed to constrain the final 1-form to be zero along landmark curves in u or v direction (vertically or horizontally), while minimizing the harmonic energy of the desired 1-form. The resulting 1-form can be quasi-holomorphic and its integration can generate a rectangular quasiconformal mapping. By an exponential map, the rectangular map can be mapped to a circle domain, where straight segments become concentric arcs. FIGS. 4A-4C show the mappings for a human facial surface (a small puncture at nose tip, which is mapped to the disk center), where the curved mouth landmark curve on the conformal map is mapped to a circular (horizontal) arc on the canonical quasiconformal map. The variation from surface conformal structure is driven by landmark straightening constraints.

The result exists and is unique. Due to the linear nature of 1-form, algorithms of the subject invention can have linear time complexity, and are efficient and practical. The induced intrinsic shape signature, Teichmüller coordinates, can then be applied to construct a Teichmüller space surface matching. The $L^2$ norm between Teichmüller coordinates can define the similarity metric of two surfaces. Using the canonical mapping, the surfaces with landmark curve constraints can be registered over the canonical domains by a linear harmonic map, where the landmark constraints between straight segments are converted to linear forms.

Embodiments of the subject invention provide novel and advantageous systems, methods, and computer readable media capable of performing surface matching and registration based on the canonical surface quasiconformal mapping for landmark curve decorated surfaces. The subject invention can conquer landmark curves on surface cases in the way of canonical quasiconformal map. Canonical surface quasiconformal mapping can be computed based on quasi-holomorphic 1-form, where the quasiconformality is driven by landmark curve straightening constraints intrinsically. The mapping can be coherent to surface uniformization theorem, and surfaces can be mapped to rectangle or circle domain and the local shapes can be preserved as much as possible. This technique can be referred to as quasiconformal straightening (QCS). Methods of the subject invention can be linear, stable and easy to compute.

Embodiments of the subject invention can obtain a novel and advantageous shape representation for landmark curve decorated surfaces, which generates an intrinsic, unique and global shape signature, which can be referred to as a QCS signature, as shape index for matching. This conformal invariant can be employed as Teichmüller coordinates to construct a subspace of the conventional Teichmüller space, which is aware of the geometry of landmark curves and increases the discriminative ability for real applications, such as to differentiate topological disks in Teichmüller space. The surface distance is given by the $L^2$ norm between the signatures.

Embodiments of the subject invention can also provide novel and advantageous landmark curve constrained surface registration methods using canonical quasiconformal mappings as described herein. The landmark curve decorated surfaces can become straight segment decorated 2D domains; then, an optimal mapping can be built over them. By taking the linear advantage of straight segments, the curves can be easily aligned. Such a method can be linear, robust, and efficient in practice.

Consider a complex-valued function, $\varphi: \square \to \square$, mapping the z-plane to the w-plane, z=x+iy, w=u+iv. Suppose $\varphi$ is differentiable. The complex partial derivative is defined as $$\frac{\partial}{\partial z} = \frac{1}{2}\left(\frac{\partial}{\partial x} - i\frac{\partial}{\partial y}\right), \frac{\partial}{\partial \bar{z}} = \frac{1}{2}\left(\frac{\partial}{\partial x} + i\frac{\partial}{\partial y}\right).$$

The Beltrami equation for $\varphi$ is given by $$\frac{\partial \phi}{\partial \bar{z}} = \mu(z)\frac{\partial \phi}{\partial z} \qquad (3)$$

where $\mu$ is called the Beltrami coefficient, which is a complex-valued function. If $\mu=0$, then $\varphi$ satisfies the Cauchy-Riemann equations, $$\frac{\partial u}{\partial x} = \frac{\partial v}{\partial y}, \frac{\partial u}{\partial y} = -\frac{\partial v}{\partial x},$$

and is called a holomorphic function, which preserves angles. The resulting mapping can be referred to as a conformal mapping. Otherwise, if $0<\|\mu\|_\infty<1$, where $\|\cdot\|_\infty$ denotes the $L^\infty$ norm, then $\varphi$ can be referred to as a quasiconformal mapping with bounded angle distortion.

General genus zero surfaces with boundaries (embedded in $\square^2$ or $\square^3$) can be used to illustrate the computational method of conformal mappings based on Hodge theory.

For a quadrilateral domain $\Omega$ with four boundary segment components, $\partial\Omega=\gamma_0+\gamma_1+\gamma_2+\gamma_3$, i.e., with four boundary corners, $p_0$, $p_1$, $p_2$, $p_3$, the holomorphic 1-form $\omega=(\tau_1, *\tau_1)$ is computed by two exact harmonic 1-forms, $\tau_1=df_1$, $\tau_2=df_2$, such that $$\begin{cases} \Delta f_1 = 0 \\ f_1|_{\gamma_3} = 0 \\ f_1|_{\gamma_1} = 1 \\ \dfrac{\partial f_1}{\partial n}\bigg|_{\gamma_0 \cup \gamma_2} = 0 \end{cases} \text{ and } \begin{cases} \Delta f_2 = 0 \\ f_2|_{\gamma_0} = 0 \\ f_2|_{\gamma_2} = 1 \\ \dfrac{\partial f_2}{\partial n}\bigg|_{\gamma_1 \cup \gamma_3} = 0 \end{cases} \quad (4)$$

Figure 5A:
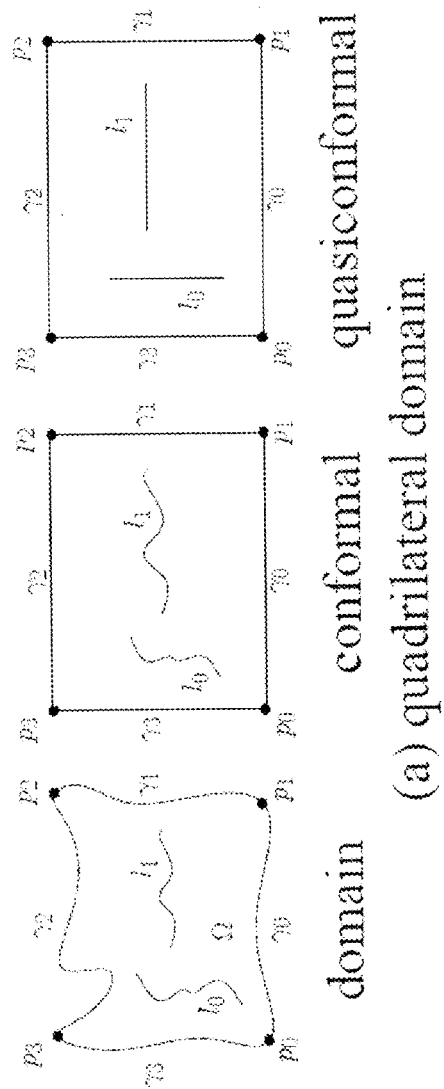
FIG. 5A shows an illustration of canonical surface mappings in the quadrilateral domain.

The conjugate $*\tau_1 = c\tau_2$, where c is a scalar function. The integration of ω gives a rectangular conformal map, where $\gamma_0$, $\gamma_2$ are mapped to horizontal boundaries of the rectangle while $\gamma_1$, $\gamma_3$ are mapped to vertical ones (see FIG. 5A).

Figure 5B:
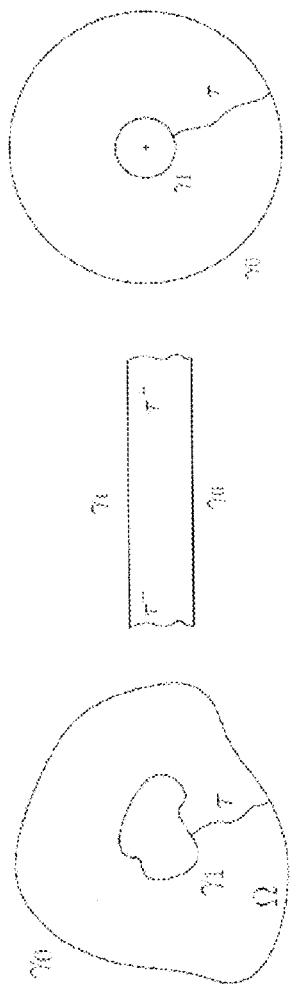
FIG. 5B shows an illustration of canonical surface mappings in the doubly-connected domain.

If a compact domain Ω has only two boundary components, $\partial\Omega = \gamma_0 - \gamma_1$, then it can be referred to as a doubly-connected domain. The whole domain can be mapped to an annulus, where two boundaries are mapped to concentric circle boundaries. The holomorphic 1-form $\tau_1$ or $*\tau_1$ is orthogonal to both boundaries, $\tau_1 = \omega_1 + c*\omega_1$, where $\omega_1$ corresponds to $\gamma_1$, such that $\int_{\gamma_i} \omega_i = \delta_i^j$ where $\delta_i^j$ is the Kronecker symbol. The integration of such a holomorphic 1-form from base point p generates the rectangular map, where the domain is sliced open by a curve τ. Then by the exponential map, the circular map is generated (see FIG. 5B).

Suppose Ω is a compact domain on the complex plane □. If Ω has a single boundary component, then it can be referred to as a simply-connected domain. By a puncture at an interior point, the domain can become a doubly-connected one and then the above computation can be applied. The whole domain can be mapped to a unit disk. Such mappings differ by Möbius transformations.

Suppose Ω has multiple boundary components, $\partial\Omega = \gamma_0 - \gamma_1 - \gamma_2 - \ldots - \gamma_n$, where γ0 represents the exterior boundary component and $\gamma_i, i=1 \ldots n$, represent the interior ones, then Ω can be referred to as a multiply-connected domain. It can be mapped to a unit disk with circular holes, called a circle domain, where one boundary is mapped to the exterior unit circle, and others are mapped to inner circles. The computation is to iteratively perform the basic operation of mapping a doubly-connected domain to a canonical annulus based on Koebe's iteration method (see, e.g., Gu et al., Numerical computation of surface conformal mappings, 2011, which is hereby incorporated by reference in its entirety).

The existence and uniqueness of conformal and quasi-conformal mappings for multiply-connected domains are guaranteed by the generalized Riemann mapping theorem and the generalized measurable Riemann mapping theorem.

Theorem 1 (Generalized Measurable Riemann Mapping).
Suppose Ω ⊂ □ a multiply-connected domain. Suppose μ: Ω→□ is a measurable complex function, such that $\|\mu\|_\infty < 1$. There exists a quasiconformal mapping φ: Ω→D whose Beltrami coefficient is μ, where D is a circle domain. Such kind of quasiconformal mappings differ by Möbius transformations.

Let S be a topological surface and all the possible Riemannian metrics on S be G={g}. Two metrics $g_1$, $g_2$ are conformally equivalent, $g_1 \sim g_2$, if there exists a function λ: S→□ such that $g_1 = e^{2\lambda} g_2$.

All domains can be classified by conformal equivalence relation. Each class shares the same conformal invariant, referred to as a conformal module, which defines a unique and global shape signature. According to Reimann mapping theorem, every simply-connected domain is conformally equivalent to the open unit disk and such kind of mappings differ by Möbius transformations. Therefore, Theorem 2. All simply-connected domains are conformally equivalent.

The conformal module for a rectangle domain is defined as the ratio of the height over the width. For a circle domain it is represented as the centers and radii of inner circles. By a Möbius normalization mapping one inner circle to be concentric, the topological annulus only requires one parameter in its conformal module. In a general case, there are n>1 inner circles, and the conformal module requires 3n−3 parameters. All conformal equivalence classes form a 3n−3 Riemannian manifold, the so-called Teichmüller space. The conformal module can be treated as the Teichmüller coordinates.

In an embodiment, a system, method, or computer readable medium can include an algorithm for canonical surface quasiconformal mapping. Such an algorithm can compute the canonical quasiconformal mapping with landmark straightening constraints for genus zero surfaces with boundaries. In certain embodiments, the surfaces can be approximated by triangular meshes embedded in $\square^3$, denoted as M=(V, E, F), where V, E, F are the sets of vertices, edges, and faces, respectively.

Assume the desire mapping is $f: (M, L) \to (D, l)$, surface mesh M is mapped to a planar parameter domain D, and D has the local coordinates (u, v). The quadrilateral case can be used for illustrative purposes only. In a particular embodiment, the computational pipeline of an algorithm of the subject invention can include performing Steps 1-4 as follows.

Step 1 can be termed "prepare landmark curves". The equation $L = \{l_k, k=1 \ldots m\}$ can be used to denote the set of m interior landmark curves on M. Assume $L = L^H \cup L^V$, where $L^H$, $L^V$ are to be mapped to horizontal and vertical straight segments, respectively. Each landmark is represented as a chain of vertices, $l_k = [v_1, v_2, \ldots, v_{n_k}]$, where $n_k$ is the number of the vertices on $l_k$.

Step 2 can be termed "compute quasi-holomorphic 1-form". Step 2 can include the following sub-steps, numbered 1-4, and the quasi-holomorphic 1-form to be computed can be $\omega = \tau_1 + i*\tau_1$, where $\tau_1 = df_1$, $*\tau_1 = \lambda\tau_2$, and $\tau_2 = df_2$:

1. Compute the harmonic functions $f_1, f_2$: Combining the straightening constraint conditions into Equation (4), Equation (5) can be obtained:

$$\begin{cases} \Delta f_1 = 0 \\ f_1|_{\gamma_3} = 0 \\ f_1|_{\gamma_1} = 1 \\ \dfrac{\partial f_1}{\partial n}\bigg|_{\gamma_0 \cup \gamma_2} = 0 \\ f_1|_{l_k^V} = s_k \end{cases} \text{ and } \begin{cases} \Delta f_2 = 0 \\ f_2|_{\gamma_0} = 0 \\ f_2|_{\gamma_2} = 1 \\ \dfrac{\partial f_2}{\partial n}\bigg|_{\gamma_1 \cup \gamma_3} = 0 \\ f_2|_{l_k^H} = t_k \end{cases} \quad (5)$$

where n is the normal vector to the boundary, $s_k$, $t_k$ are unknown variables, computed automatically for each landmark curve. Two types of straightening constraints are: a) Horizontal: for $l_k \in L^H$, $v(v_i) = s_k$, $i = 1 \ldots n_k$; and b) Vertical: $l_k \in L^V$, $u(v_i) = t_k$, $i = 1 \ldots n_k$. The Laplace-Beltrami operator Δ is approximated by the cotangent weight $w_{ij}$, $\Delta f(v_i) = \Sigma_{[v_i,v_j] \in E} w_{ij}(f(v_i) - f(v_j))$. For edge $[v_i, v_j]$, suppose two adjacent faces are $[v_i, v_j, v_k]$ and $[v_j, v_i, v_l]$. Then its weight is defined as $w_{ij} = \cot\theta_k^{ij} + \cot\theta_l^{ij}$, $[v_i, v_j] \notin \partial M$; or $w_{ij} = \cot\theta_k^{ij}$, $[v_i, v_j] \in \partial M$, where $\theta_k^{ij}$ is the corner angle at $v_k$ in $[v_i, v_j, v_k]$.

2. Compute harmonic 1-forms by gradient computation, $\tau_1 = \nabla f_1$, $\tau_2 = \nabla f_2$.

3. Compute conjugate 1-form of $\tau_1$ by Hodge star operator, $*\tau_1 = \lambda \tau_2$ ($\lambda$ is a scalar), by minimizing the energy $E(\lambda) = \Sigma_{[v_i, v_j, v_k] \in F} |\nabla f_2 - \lambda n \times \nabla f_1|^2 A_{ijk}$, where $A_{ijk}$ is the area of face $[v_i, v_j, v_k]$, and n is the normal vector to the face.

4. Compute $\omega = \tau_1 \sqrt{-1} * \tau_1$.

The problem turns to minimizing the harmonic energy, $E(f) = \Sigma_{[v_i, v_j] \in E} w_{ij} (f(v_i) - f(v_j))^2$, by considering the landmark constraints in Equation (5).

Step 3 can be termed "computing quasiconformal mapping". The quasiconformal mapping can be generated by integrating the obtained quasi-holomorphic 1-form $\omega$ over M, $f(q) = \int_{\gamma(p,q) \in M} \omega$, $\forall q \in V$, where $\gamma(p, q)$ is an arbitrary path from the base vertex p to the current vertex q. On the planar domain, $f(p) = (0, 0)$, $f(\gamma_i)$, $f(l_k)$ are all straight lines.

Figure 6A:
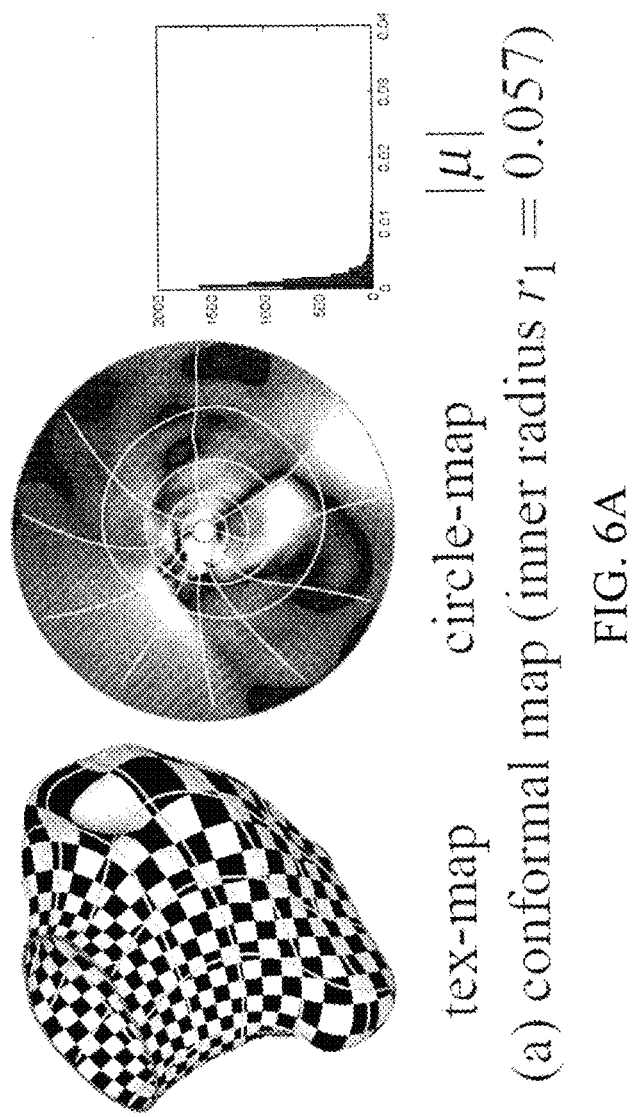
FIG. 6A shows conformal mapping for a doubly-connected domain.
Figure 6B:
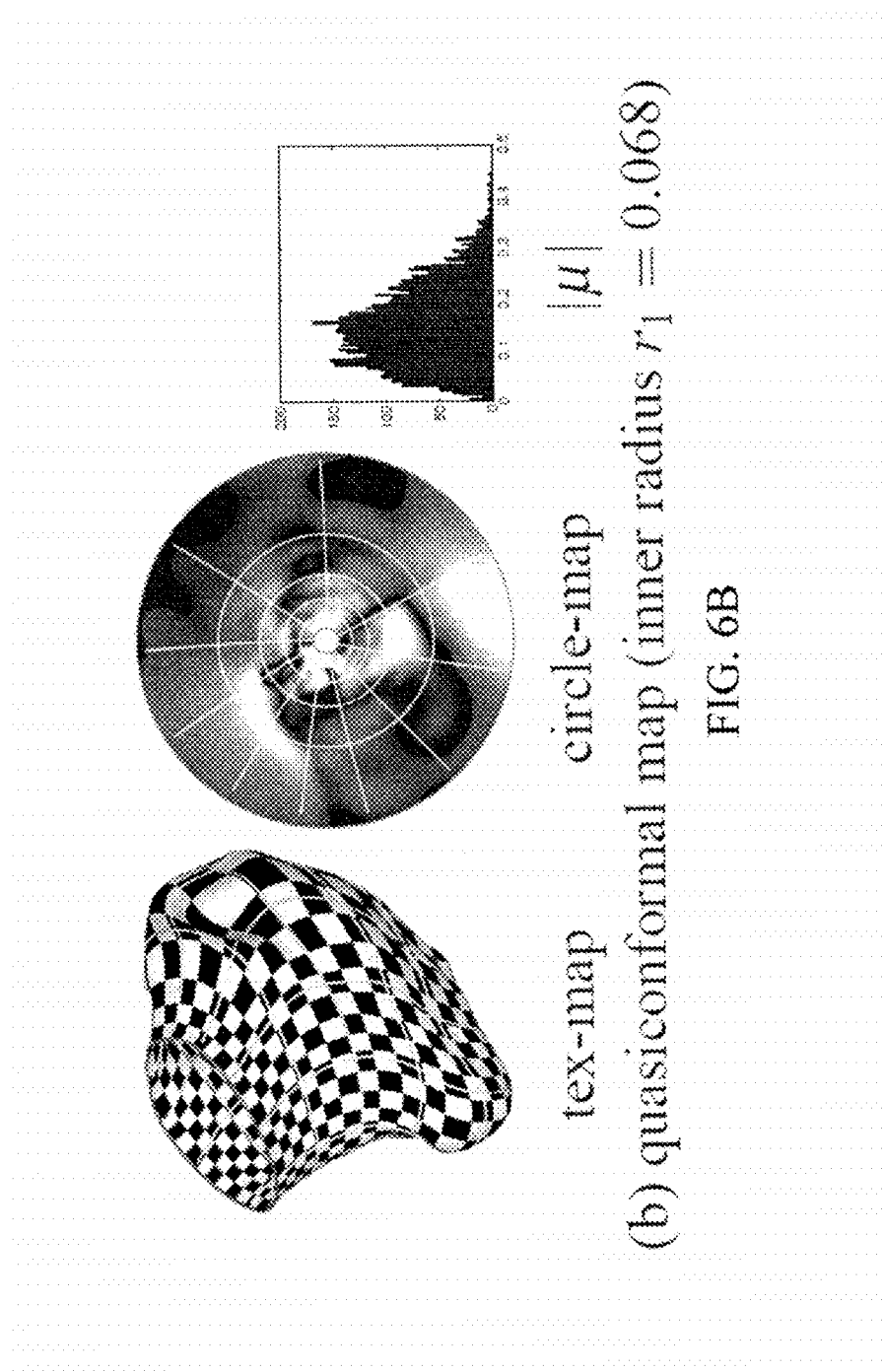
FIG. 6B shows quasiconformal mapping for a doubly-connected domain.

The computational algorithms for other genus zero surface cases can be similar They can share the same key component of minimizing harmonic energy with landmark straightening constraints. By the exponential map, the rectangular domain can be converted to a circle domain, where the straight lines are mapped to circular arcs. FIGS. 6A and 6B show a doubly-connected case. The difference from the conformal map can be evaluated by the angle distortion of checker-board textures and the distributions of Beltrami coefficients (mean of $|\mu|$: 0.15 vs. 0.001). FIGS. 7A-7D show examples for a human facial surface with multiple landmark curves. The solution exists and is unique. The resulting mapping preserves local shapes as much as possible and is intrinsic to geometry of both surface and landmark curves. The algorithm including the three steps just described can solve sparse linear systems and have linear complexity. In certain embodiments, the conjugate gradient method can be applied.

In an embodiment, an algorithm can be used for surface matching. The proposed quasiconformal mapping $\varphi$: (S, L)→(D, l) can offer an intrinsic canonical shape representation for surfaces decorated with landmark curves. The positions and the lengths of the canonical-shaped landmarks and the conformal modules of the background domain can be employed as the shape signature (QCS signature), which is a conformal invariant. It can be used as Teichmüller coordinates to construct the Teichmüller space. The $L^2$ norm between signatures gives the distance between two decorated surfaces.

A quadrilateral surface with m landmarks can be mapped to a rectangle domain with horizontally or vertically straightened landmarks (see FIGS. 7A-7D). Assume the bottom-left corner of the rectangle domain is set to be the origin (0,0). Then the QCS signature can be defined as $$QCS(S) = \left\{ \frac{x_j^H}{w}, \frac{y_j^H}{h}, \frac{d_j^H}{w} \right\} \cup \left\{ \frac{x_k^H}{w}, \frac{y_k^H}{h}, \frac{d_k^H}{h} \right\} \cup \text{Mod}(D) \qquad (6)$$

where h,w denote the height and the width of D, respectively, $(x_j^H, y_j^H)$ represents the left endpoint of $\varphi(l_j)$, $l_j \in L^H$, $(x_k^V, y_k^V)$ represents the bottom endpoint of $\varphi(l_k)$, $l_k \in L^V$, $d_k$ denotes the length of the segment $\varphi(l_k)$, $l_k \in L$, and Mod is the conformal module of D, h/w, as defined herein near the description of Theorem 2 above. Then the Teichmüller space is 3m+1 dimensional.

For (n+1)-connected domains, general genus zero (g=0) domains with n+1 boundaries and m landmarks can be mapped to circle domains (normalized onto unit disk) with radial straight or concentric circular landmarks. Then the QCS signature can be defined as $$QCS(S) = \left\{ \gamma_j, \frac{\theta_j^1}{2\pi}, \frac{\theta_j^2}{2\pi} \right\} \cup \left\{ \gamma_k^1, \gamma_k^2, \frac{\theta_k}{2\pi} \right\} \cup \text{Mod}(D) \qquad (7)$$

where $(r_j, \theta_j^1, \theta_j^2)$ denotes the radius and argument angles of the concentric circular arc $\varphi(l_j)$, $l_j \in L^H$; $(r_k^1, r_k^2, \theta_k)$ denotes the radii and the argument angle of the radial straight segment $\varphi(l_k)$, $l_k \in L^V$, and Mod is the conformal module of circle domain D, including the center positions and radii of the inner circles, as defined herein near the description of Theorem 2 above. Assume D is normalized by a Möbius transformation. $T_{0,n,m}$ can be used to denote the Teichmüller space of open genus zero (g=0) surfaces with n inner boundaries and m landmarks.

For multiply-connected domains, $\dim T_{0,n>1,m>0} = 3m+(3n-3)$.

For simply-connected domains, $\dim T_{0,n=0,m>0} = 3m-2$.

For doubly-connected domains, $\dim T_{0,n=1,m>0} = (3m-1)+1 = 3m$.

For each open landmark curve with two endpoints on boundary in quadrilaterals or non-trivial landmark loop in connected domains, the total dimension decreases by 2.

In an embodiment, an algorithm can be used for surface registration. Decorated surfaces can be mapped to canonical planar domains with canonically shaped (e.g., straight) landmark curves using the quasiconformal map as described herein and then convert surface registration problems to image registration problems, where the landmark curve constraints become linear constraints between images.

Figure 13:
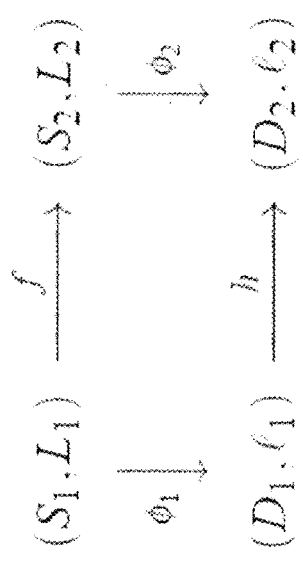
FIG. 13 shows a graphic representation of surface registration framework.

Regarding registration framework, suppose $(S_k, L_k)$, k=1,2 are the source and target surfaces $S_k$ decorated with landmark curves $L_k$, respectively. In order to compute the registration $f$: $(S_1, L_1) \rightarrow (S_2, L_2)$, decorated surfaces to can first be mapped to decorated canonical domains, $\varphi_k(S_k, L_k) \rightarrow (D_k, l_k)$, then the optimal mapping h: $(D_1, l_1) \rightarrow (D_2, l_2)$ can be constructed, such that straight line $l_1$ is aligned with straight line $l_2$ and the harmonic energy of the mapping is minimized. The registration is given by $f = \varphi_2^{-1} \circ h \circ \varphi_1$. FIG. 13 shows a graphic representation of this framework.

This quasiconformal map-based registration framework works for landmark curve constrained surfaces with general deformations, subsuming rigid motion, isometry, and conformal transformation. This framework can be generalized to more general surfaces and handle point-curve mixed constraints. In contrast, the related art cannot introduce each landmark curve as a whole; accordingly, a heuristic alternative is to sample the curve to isolated points then apply a point-constrained registration method.

In an embodiment, an algorithm with landmark curve constraints can include a computation that is based on the optimization of constrained harmonic energy to smooth out distortion as much as possible. A harmonic map h: $(D_1, l_1) \rightarrow (D_2, l_2)$, $\nabla h = (h_1, h_2)$ can be generated to minimize the energy $E(h) = \int_{D_1} |\nabla \cdot \nabla h|^2 dA$ with the Dirichlet and Neumann boundary conditions on both canonical domain boundaries and horizontal or vertical landmarks. Suppose $D_k$ are rectangles, $\partial D_k = \gamma_0^k + \gamma_1^k + \gamma_2^k + \gamma_3^k$, where $(y_i^1, y_i^2)$, i=0 . . . 3 denotes a pair of corresponding boundaries, and $L_k = L_k^H \cap L_k^V$. Then, $(l_1, l_2)$ and $(p_1, p_2)$ can be used to denote a pair of segments and endpoints to be aligned, respectively, and Equation (8) can be solved:

$$\begin{cases} \Delta h_1 = 0 \\ h_1|_{\gamma_3^u} = \phi_2^u|_{\gamma_3^u} - \phi_1^u|_{\gamma_3^u} \\ h_1|_{\gamma_1^u} = \phi_2^u|_{\gamma_1^u} - \phi_1^u|_{\gamma_1^u} \\ \frac{\partial h_1}{\partial n}\Big|_{\gamma_0 \cup \gamma_2} = 0 \\ h_1|_{l_1^V} = \phi_2^u|_{l_2^V} - \phi_1^u|_{l_1^V} \\ h_1|_{p_1^H} = \phi_2^u|_{p_2^H} - \phi_1^u|_{p_1^H} \end{cases} \text{ and } \begin{cases} \Delta h_2 = 0 \\ h_2|_{\gamma_0^1} = \phi_2^v|_{\gamma_0^2} - \phi_1^v|_{\gamma_0^1} \\ h_2|_{\gamma_2^1} = \phi_2^v|_{\gamma_2^2} - \phi_1^v|_{\gamma_2^1} \\ \frac{\partial h_2}{\partial n}\Big|_{\gamma_1 \cup \gamma_3} = 0 \\ h_2|_{l_1^H} = \phi_2^v|_{l_2^H} - \phi_1^v|_{l_1^H} \\ h_2|_{p_1^V} = \phi_2^v|_{p_2^V} - \phi_1^v|_{p_1^V} \end{cases} \quad (8)$$

Then $h(p)=p+\nabla h(p)$, $p \in D_1$. The desired mapping $f = \varphi_2^{-1} \circ h \circ \varphi_1$.

The registration accuracy can be evaluated by an energy form $E(f) = \int_{p \in S_1} (H(p) - H(f(p)))^2 + (K(p) - K(f(p)))^2 + (\lambda(p) - \lambda(f(p)))^2$, where H, K, λ denote the mean curvature, the Gauss curvature, and the conformal factor, respectively.

The 1-form method according to embodiments of the subject invention can solve positive definite sparse linear systems, and therefor has linear time complexity. The solution exists and is unique. The 1-form method is stable and robust and can handle small geometric and topological noises or variations under different modalities (e.g., resolution, quality, smoothness, boundary noise, small holes, and/or handles) and multiple and complicated decorative landmark curves (open and closed). Methods of the subject invention are easy to implement and fast to compute.

The QCS technique of the subject invention can be incorporated into the 1-form computation for general topological surfaces. In addition, due to the generality of quasi-conformal mapping, the registration method described herein can be general to handle any types and intensities of deformations, including small or significantly large rigid motions, isometries, conformal transformations, and quasi-conformal deformations.

Embodiments of the subject invention can advantageously compute landmark curve-driven canonical quasi-conformal maps and use the canonical shape representation for landmark curve-decorated surface matching and registration. Compared with conformal maps of pure surfaces, the generated intrinsic canonical quasiconformal map studies the nature of curves in the surface and the influence to conformal structure, and provides the feature-aware shape signature and global representation. The conformal welding signature needs to divide the whole surface to multiple components by closed contours; it cannot deal with open curves. The QCS signature of the subject invention can encode landmark geometry, and therefore is more capable to represent a shape both globally and locally. It can be used to differentiate the topological disk surfaces.

Embodiments of the subject invention advantageously provide linear constraints between straightened curves and have practical advantages over the related art, for example due to the linearity of 1-forms. Surface and landmark curves can be dealt with as a whole without changing topology. Given two isometric surfaces with different embeddings, a shape metric according to the subject invention can give 0.

According to embodiments of the subject invention, a user can freely select landmark curves and design straightening styles according to the application needs. In order to arrange the landmarks properly and avoid large distortions, their shapes can first be observed on a conformal mapping domain, for example in FIG. 7B, where the styles can be automatically extracted by comparing the average slope of the curve with the u and v-axis. Potential applications include, but are not limited to, artwork design, large-scale shape retrieval in industry, medical imaging, brain morphology studies, facial expression analysis, supine-prone colon registration, and animation (e.g., in the graphics industry).

Embodiments of the subject invention provide novel and advantageous surface matching and registration methods based on the intrinsic canonical surface quasiconformal mapping, which maps the landmark curves to be horizontal or vertical straight lines on a canonical 2D domain and preserves the local shapes as much as possible. The mapping is unique and intrinsic to surface and landmark curve geometry. They give the novel conformal invariant shape signature to construct the feature-aware Teichmüller space for surface matching. They can easily deal with surface registration with straightened landmark curve constraints. Algorithms can be based on 1-form and can have linear time complexity, while being efficient and practical. In many embodiments, a computer-readable medium can include computer-executable instructions for performing a method or algorithm as described herein.

The methods and processes described herein can be embodied as code and/or data. The software code and data described herein can be stored on one or more computer-readable media, which may include any device or medium that can store code and/or data for use by a computer system. When a computer system reads and executes the code and/or data stored on a computer-readable medium, the computer system performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that is capable of storing computer-readable information/data. Computer-readable media should not be construed or interpreted to include any propagating signals.

A greater understanding of the present invention and of its many advantages may be had from the following examples, given by way of illustration. The following examples are illustrative of some of the methods, applications, embodiments and variants of the present invention. They are, of course, not to be considered in any way limitative of the invention. Numerous changes and modifications can be made with respect to the invention.

EXAMPLE 1

An algorithm including Step 1 ("slice surface open"), Step 2 ("compute quasi-holomorphic 1-forms"), Step 3 ("compute quasiconformal mapping"), and Step 4 ("optimize quasiconformal mapping") as described herein was tested on real virtual colonoscopy colon data from the public databases of the National Institute of Biomedical Imaging and Bioengineering (NIBIB) and the National Institute of Health (NIH). Digital cleansing, segmentation, de-noising, and colon inner wall surface extraction were performed on raw computed tomography (CT) scans in the data pre-processing. Then, smoothing, re-meshing, and simplification were performed on triangular meshes. FIG. 1A shows an image of a colon; FIG. 1B shows three images of the conformal map; and FIG. 1C shows three images of the optimal quasiconformal map.

The taenia coli and haustral folds were extracted on the mean curvature color-encoded conformal mapping images, as illustrated in FIG. 1B. The skeleton of the blue bands (corresponding to haustral folds) were first extracted and then projected onto a 3D surface. By connecting the three disjointing haustral folds at the same latitudinal level, a loop was obtained by the shortest path between them. Each loop was then perturbed to be the locally shortest. In collapsed or bending areas due to occlusions, some haustral folds were missing or could not be connected. The algorithm was stable to accept both closed and open landmark curves. Taeniae coli were extracted by connecting the middle points between two latitudinally consecutive endpoints of haustral folds.

The algorithm was tested on 45 colon surfaces, including 30 colon segments with 3 taeniae coli (TC) and 15 whole colons where only 1 or 2 TC could be automatically extracted (mainly restricted by flat geometry of sigmoid and rectum). The algorithm was tested on a desktop with 3.7 GHz CPU and 16 GB of RAM. The whole pipeline was automatic and was effective, stable, and robust for all the tests, due to the linearity of 1-form.

Figure 3A:
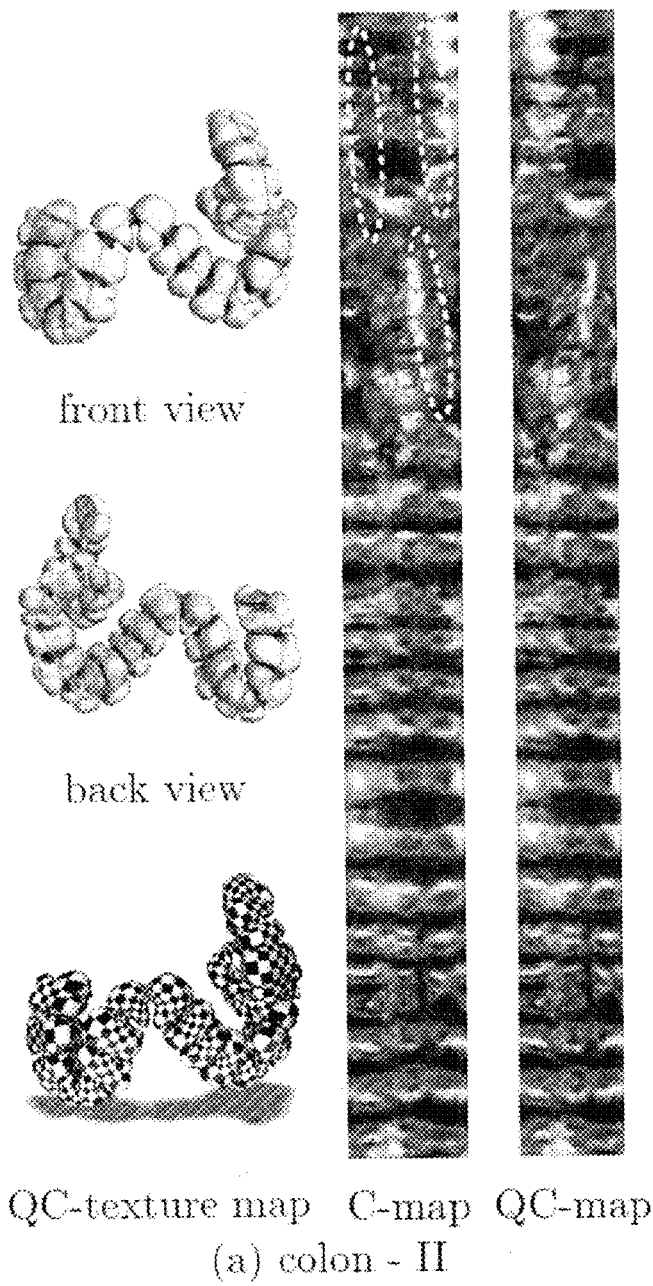
FIG. 3A shows images, a conformal map, and a quasi-conformal map of a colon.
Figure 3B:
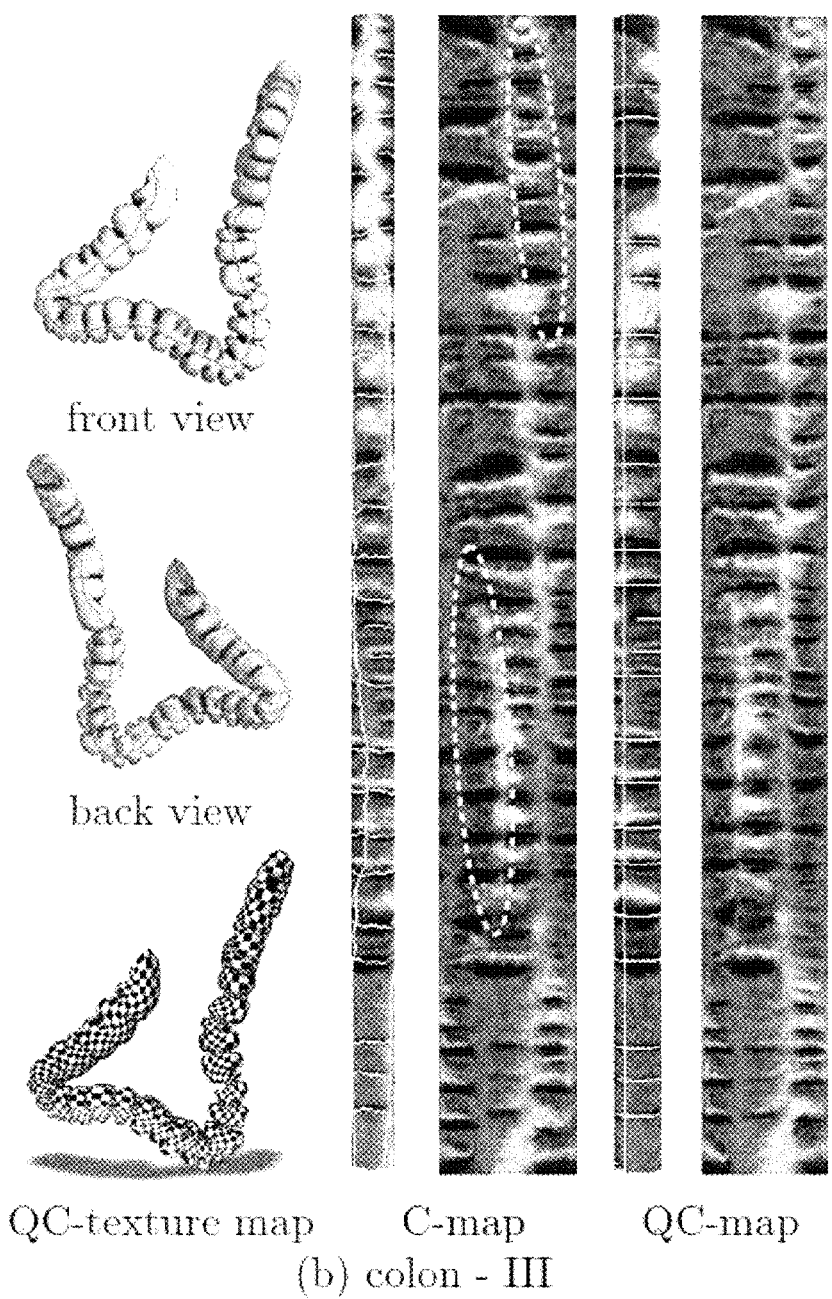
FIG. 3B shows images, conformal maps, and quasiconformal maps of a colon.

FIG. 3A illustrates mapping results for a colon different from that shown in FIGS. 1A-1C, with the far right image showing a quasiconformal map, the second image from the far right showing a conformal map, the top-left image showing a front 3D view of the colon, the middle-left image showing a back 3D view of the colon, and the bottom-left image showing a quasiconformal texture map of the colon. FIG. 3B illustrates mapping results for a colon different from that shown in FIGS. 1A-1C and different from that shown in FIG. 3A. In FIG. 3B, the far right two images show quasiconformal maps, the third and fourth images from the far right show conformal maps, the top-left image shows a front 3D view of the colon, the middle-left image shows a back 3D view of the colon, and the bottom-left image shows a quasiconformal texture map of the colon.

FIGS. 1A-1C, 3A, and 3B visually illustrate the conformal and quasiconformal mapping results of three colons (a first colon in FIGS. 1A-1C, a second in FIG. 3A, and a third in FIG. 3B). The yellow dotted circles highlight the areas with broken taenia coli on rectangle conformal flattening images. These areas were straightened on quasiconformal flattening images and the taeniae coli were connected; at the same time, there was no significant shape distortion from conformal flattening. This gives the virtual colonoscopy user a global and straightforward view for screening polyps or abnormalities (see FIGS. 1A-1C). The polyp is labeled in the solid, light-colored (yellow) circle on both the conformal (right-most image of FIG. 1B) and quasiconformal (right-most image of FIG. 1C) views. Table 1 gives the corresponding computational statistics, including running time, the initial max $|\mu_0|$ in Step 3 and the optimal $|\mu_n|$ in Step 4. The average max $|\mu_0|$ and optimal $|\mu_n|$ over 45 tests were 0.46 and 0.17, respectively. The max $|\mu|$ was minimized, as seen in FIG. 2A, and the distribution of $|\mu_n|$ became almost uniform, as seen in FIG. 2B.

TABLE 1

Statistics on colon flattening experiments

| Model | #vertex | #face | #landmark | time | C-Mod | QC-Mod | max $|\mu_0|$ | optimal $|\mu_n|$ |
|---|---|---|---|---|---|---|---|---|
| I | 9,608 | 19,105 | 5h, 3v | 10 s | 2.32 | 2.18 | 0.49 | 0.17 |
| II | 19,085 | 38,114 | 25h, 3v | 40 s | 9.69 | 11.04 | 0.42 | 0.17 |
| III | 16,459 | 32,827 | 36h, 3v | 35 s | 8.37 | 9.17 | 0.44 | 0.16 |

EXAMPLE 2

A landmark-driven canonical quasiconformal mapping according to an embodiment of the subject invention was used during experiments on human facial and brain surfaces to demonstrate its efficiency and efficacy. A set of anatomical facial landmark curves was considered: 1) the curve along eyebrows $l_b$; 2) the geodesic curve between inner eye corners $l_e$; 3) the geodesic curve between mouth corners $l_m$; and 4) the symmetry axis curve $l_n = l_{n1} \cup l_{n2}$, split into two parts by nose tip, as shown in FIG. 7A. In canonical mapping, $L^H = \{l_b, l_e, l_m\}$ and $L^V = \{l_n\}$ or $\{l_{n1}, l_{n2}\}$ were set. For brain surfaces, the anatomical sulci and gyri curves were considered. The algorithms were tested on a desktop with 3.7 GHz CPU and 16 GB of RAM. The whole pipeline was automatic. For mapping a facial surface with 120,000 triangles and a brain surface with 20,000 triangles, the average running times were 10 seconds and 3 seconds, respectively. The registration process included two such QC maps and another mapping over 2D domains totally cost 3 times the mapping time.

FIGS. 7A-7D show the mapping results for a 3D facial surface decorated with multiple landmark curves. The images in the upper row of FIGS. 7A-7D each shows a surface with prescribed four boundary corners (a quadrilateral) that is mapped to a rectangle. The images in the bottom row of FIGS. 7A-7D each shows a surface that is mapped to a unit disk. FIG. 7A shows 3D views of the landmark curve decorated surface; FIG. 7B shows conformal maps, including texture mapping results in the second column of FIG. 7B; FIG. 7C shows canonical quasiconformal maps with landmark straightening constraints, including texture mapping results in the second column of FIG. 7C; and FIG. 7D shows quasiconformal maps with a constraint change on eyebrow landmark. The angle distortions are illustrated by the texture mapping results. Table 2 gives the numerical results for QCS signatures of the two cases shown in FIG. 7C, computed by Equation (6).

TABLE 2

Shape signatures

Figure 8:
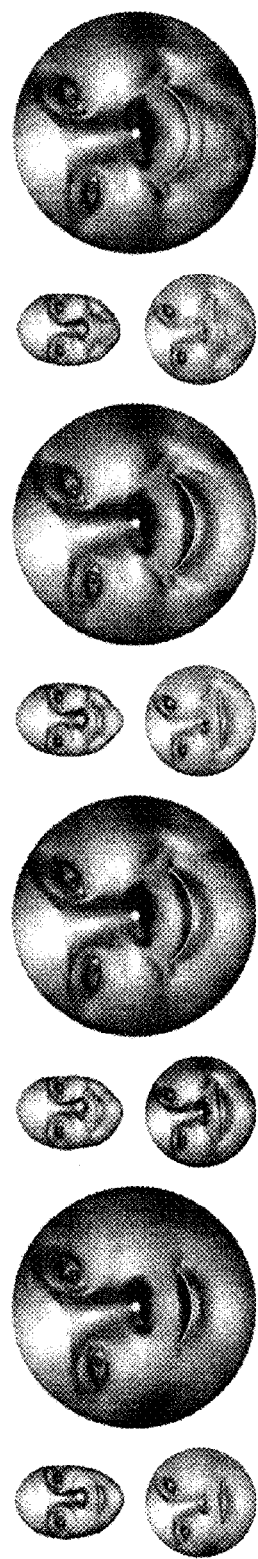
FIG. 8 shows surface matching for a deforming facial expression sequence from the same subject; the mouth landmark $l_1$ is employed; the bottom-left small disk in each of the four cases is the conformal mapping result; and the large disk in each of the four cases is the quasiconformal mapping result.

| Models | Signatures |
|---|---|
| FIG. 7C upper-bottom ($l_b$; $l_e$; $l_m$; $l_n$; Mod) | (0.260, 0.849, 0.638; 0.433, 0.728, 0.278; 0.371, 0.285, 0.398; 0.576; 0.954) (0.373, 0.135, 0.363; 0.238, 0.141, 0.346; 0.254, 0.617, 0.849; 0.475) |
| FIG. 8 left-right ($l_m$) | (0.508, 0.214), (0.519, 0.266), (0.492, 0.294), (0.527, 0.282) |
| FIG. 9 left-right ($l_m$; $l_e$) | (0.398, 0.234; 0.334, 0.149, 0.356), (0.415, 0.223; 0.344, 0.145, 0.36), (0.384, 0.213; 0.355, 0.143, 0.365), (0.426, 0.183; 0.307, 0.147, 0.376), (0.427, 0.197; 0.384, 0.14, 0.359), (0.463, 0.236; 0.366, 0.156, 0.343) |

As stated in Theorem 2, conformal mappings keep the same structure for the topological disk surfaces and cannot differentiate them in Teichmüller space. The QCS signature is aware of feature details and has the discriminative ability. In the experiments, the QCS signature was employed for shape matching on two categories of human facial scans which were successfully tested: 1) 5 human facial expression sequences from the same subject (each has 400 frames) (see FIG. 8), and 2) human facial surfaces from different subjects (BU-3DFE database—Yin et al., A 3D facial expression database for facial behavior research, 2006; 100 subjects with various expressions) (see FIG. 9). Table 2 gives the QCS signatures computed by Equation (5).

Figure 9:
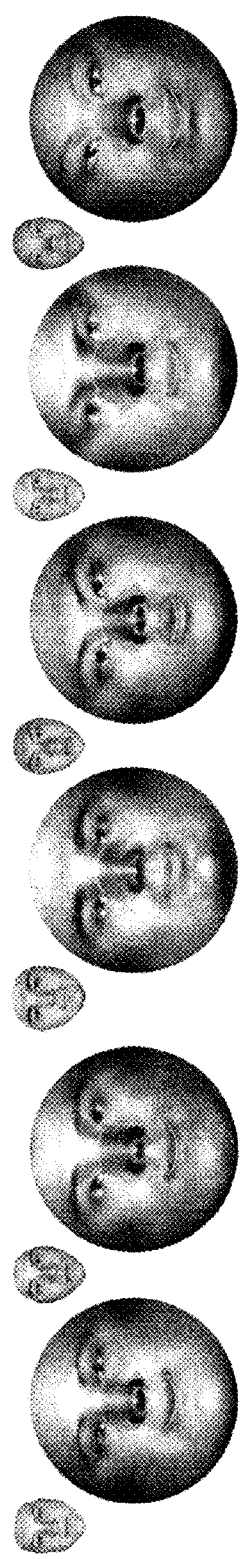
FIG. 9 shows surface matching by landmark-driven quasiconformal mappings for neutral facial surfaces from different subjects; the inner eye corner and mouth landmarks $l_e$, $l_m$ are employed; and the large disk for each case is the quasiconformal mapping result.

Referring to FIG. 9, the expression change is mainly around mouth area, so one landmark $l_m$ was introduced to study the dynamics to conquer the conformal equivalence of topological disk faces. The $L^2$ norm geometric distances (similarity of expressions) to the leftmost expression $d(S_k, S_0)$=0, 0.053, 0.071, 0.082, k=0 . . . 3. Referring to FIG. 9, QCS signatures were used to differentiate the faces from different subjects. The geometric distances (similarity of faces) to the leftmost $d(S_k, S_0)$=0, 0.023, 0.035, 0.067, 0.069, 0.074, k=0 . . . 5. The experimental results show that the QCS signature is promising for large-scale content-based shape retrieval applications for 2D images and 3D objects, such as face recognition, brain surface classification, and general geometric search engine.

EXAMPLE 3

Figure 11A:
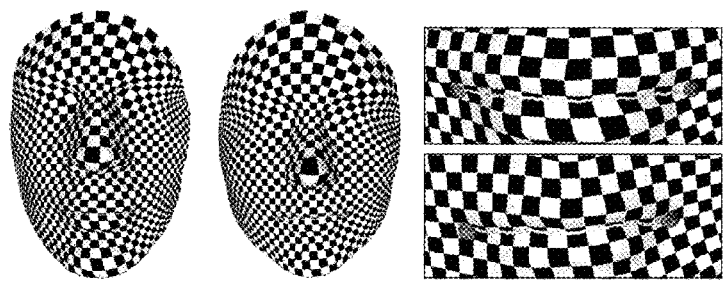
FIG. 11A shows facial surface registration for two subjects; lip landmark curve constraint is employed.

A registration algorithm according to an embodiment of the subject invention, as described herein with reference to FIG. 13, was tested on two categories of 3D non-rigid surfaces: 1) human facial surfaces with different expressions from the same subject (see FIGS. 10A-10E), and neutral faces from different subjects (see FIGS. 11A-11B); and 2) human brain surfaces from control group and patient group (see FIGS. 12A-12E). Each pair had large geometry variance and the deformation was quasiconformal. The geometric registration accuracy was evaluated by the energy form E(f) described herein in the section below Equation (8). E(f)=0.03 for FIGS. 10A-10E, E(f)=0.05 for FIGS. 11A and 11B, and E(f)=0.08 for FIGS. 12A-12E. The registration effects can also be visually checked by the consistent texture mapping results.

Figure 11B:
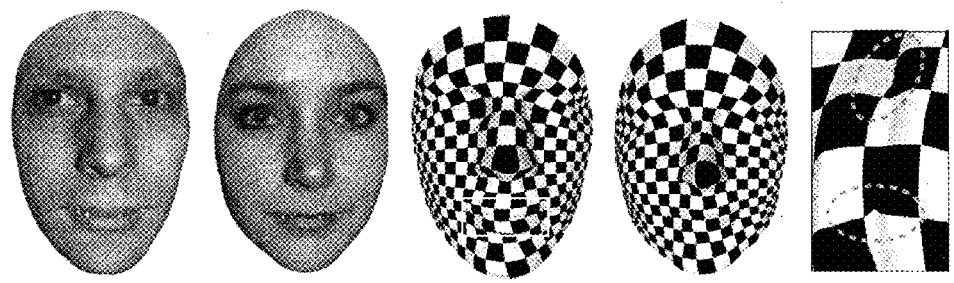
FIG. 11B shows facial surface registration for two subjects; curve constraint is sampled as point constraints.

The method of the subject invention can take the curve constraints as linear constraints. A comparison test was performed, as shown in FIG. 11B, where 9 point constraints were sampled to replace curve constraint. The result was not smooth, significantly different from the result (see the close-up view in FIG. 11B). The accuracy could be improved by dense sampling, which would increase cost. The results demonstrate the advantages of the method of the subject invention in terms of accuracy, efficiency, and practicality.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

REFERENCES

Ahlfors, L.: Lectures in Quasiconformal Mappings. Van Nostrand Reinhold, New York (1966).

Boris, S., Schröder, P., Pinkall, U.: Conformal equivalence of triangle meshes. ACM TOG 27(3), 1-11 (2008).

Center, M. M., Jemal, A., Smith, R. A.,Ward, E.: Worldwide variations in colorectal cancer. CA: A Cancer Journal for Clinicians 59(6) (2009) 366-378.

Desbrun, M., Meyer, M., Alliez, P.: Intrinsic parameterizations of surface meshes. In: Eurographics '02. pp. 209-218 (2002).

Farkas, H. M., Kra, I.: Riemann Surfaces. Springer, New York (1980).

Farkas, H. M., Kra, I.: Riemann Surfaces (Graduate Texts in Mathematics). Springer (1991).

Floater, M. S., Hormann, K.: Surface parameterization: a tutorial and survey. pp. 157-186. Springer.

Funkhouser, T., Min, P., Kazhdan, M., Chen, J., Halderman, A., Dobkin, D., Jacobs, D.: A search engine for 3d models. ACM TOG 22(1), 83-105 (2003).

Gibson, S. F. F.: Constrained elastic surface nets: Generating smooth surfaces from binary segmented data. In: W. M. Wells and A. C. F. Colchester (eds.) MICCAI 1998, LNCS, vol. 1496, pp. 888-898, Springer London, UK (1998).

Gu, X., Yau, S. T.: Global conformal parameterization. In: Proc. of Symposium on Geometry Processing (2003) 127-137.

Gu, D. X., Zeng, W., Luo, F., Yau, S. T.: Numerical computation of surface conformal mappings. Computational Methods and Functional Theory 11(2), 747-787 (2011).

Guggenheimer, H. W.: Differential Geometry. Dover Publications (1977).

Haker, S., Angenent, S., Kikinis, R.: Nondistorting flattening maps and the 3d visualization of colon ct images. IEEE TMI 19 (2000) 665-670.

Hong, L., Muraki, S., Kaufman, A., Bartz, D., He, T.: Virtual voyage: Interactive navigation in the human colon. In: Proc. of SIGGRAPH (1997) 27-34.

Hong, W., Qiu, F., Kaufman, A.: A pipeline for computer aided polyp detection. IEEE TVCG 12(5) (2006) 861-868.

Hong, W., Gu, X., Qiu, F., Jin, M., Kaufman, A.: Conformal virtual colon flattening. In: Proc. of ACM Symposium on Solid and Physical Modeling (2006) 85-93.

Jin, M., Zeng, W., Luo, F., Gu, X.: Computing Teichmüller shape space. IEEE TVCG 15(3), 504-517 (2009).

Kazhdan, M., Funkhouser, T., Rusinkiewicz, S.: Rotation invariant spherical harmonic representation of 3D shape descriptors. SGP '03 pp. 156-164 (2003).

Kurtek, S., Srivastava, A., Klassen, E., Laga, H.: Landmark-guided elastic shape analysis of spherically-parameterized surfaces. Computer Graphics Forum (Proceedings of Eurographics '13 32(2), 429-438 (2013).

Levy, B., Petitjean, S., Ray, N., Maillot, J.: Least squares conformal maps for automatic texture atlas generation. SIGGRAPH '02 (2002).

Lui, L., Wang, Y., Chan, T., Thompson, P.: Automatic landmark tracking and its application to the optimization of brain conformal mapping. pp. II: 1784-1792 (2006).

Lui, L. M., Wong, T. W., Zeng, W., Gu, X., Thompson, P. M., Chan, T. F., Yau, S. T.: Optimization of surface registrations using Beltrami holomorphic flow. J. of Scie. Comp. 50(3), 557-585 (2012).

Lui, L. M., Gu, X., Yau, S. T.: Convergence of an iterative algorithm for teichmiiller maps via harmonic energy optimization. Technical report (2013) ftp://ftp.math.ucla.edu/pub/camreport/cam13-36. pdf.

Lui, L. M., Zeng, W., Yau, S. T., Gu, X.: Shape analysis of planar multiply-connected objects using conformal welding. IEEE TPAMI 36(7), 1384-1401 (2014).

Marino, J., Zeng, W., Gu, X., Kaufman, A.: Context preserving maps of tubular structures. IEEE TVCG 17(2) (2011) 1997-2004.

Qiu, F., Fan, Z., Yin, X., Kaufman, A., Gu, X.: Colon flattening with discrete Ricci flow. In: Metaxas, D., Axel, L., Fichtinger, G., Szkely, G. (eds.) MICCAI 2008 workshop, LNCS, vol. 5242, pp. 97-102. Springer, Heidelberg (2008).

Schoen, R., Yau, S. T.: Lecture on Harmonic Maps, vol. 2. International Press Incorporated, Boston (1997).

Sharon, E., Mumford, D.: 2D-shape analysis using conformal mapping. IJCV 70,55-75 (2006).

Sheffer, A., Praun, E., Rose, K.: Mesh parameterization methods and their applications. vol. 2 (2006).

Shi, R., Zeng, W., Su, Z., Damasio, H., Lu, Z., Wang, Y., Yau, S. T., Gu, X.: Hyperbolic harmonic mapping for constrained brain surface registration. In: IEEE CVPR'13 (2013).

Vining, D., Shifrin, R., Grishaw, E., Liu, K., Choplin, R.: Virtual colonoscopy (abstract). Radiology 193(P) (1994) 446.

Weber, O., Myles, A., Zorin, D.: Computing extremal quasiconformal maps. Comp. Graph. Forum 31(5), 1679-1689 (2012).

Yin, L., Wei, X., Sun, Y., Wang, J., Rosato, M. J.: A 3D facial expression database for facial behavior research. In: IEEE FG'06. pp. 211-216 (2006).

Zeng,W., Zeng, Y.,Wang, Y., Yin, X. T., Gu, X., Samaras, D.: 3D non-rigid surface matching and registration based on holomorphic differentials. In: ECCV '08 (2008).

Zeng, W., Luo, F., Yau, S. T., Gu, X.: Surface quasi-conformal mapping by solving Beltrami equations. In: Proc. of IMA Math. of Surfaces XIII. (2009) 391-408.

Zeng, W., Samaras, D., Gu, X. D.: Ricci flow for 3D shape analysis. IEEE TPAMI 32(4), 662-677 (2010).

Zeng, W., Marino, J., Gurijala, K., Gu, X., Kaufman, A.: Supine and prone colon registration using quasi-conformal mapping. IEEE TVCG 16(6) (2010) 1348-1357.

Zeng, W., Gu, X.: Registration for 3D surfaces with large deformations using quasiconformal curvature flow. In: IEEE CVPR '11 (2011).

Zeng, W., Shi, R.,Wang, Y., Yau, S. T., Gu, X.: Teichmüller shape descriptor and its application to Alzheimer's disease study. IJCV 105(2), 155-170 (2013).

What is claimed is:

1. A non-transitory computer-readable medium having computer-executable instructions for performing a method for producing a flattened map of an image, the method comprising:
  receiving data for a three-dimensional surface of the image;
  computing a quasi-holomorphic 1-form of the surface;
  integrating the quasi-holomorphic 1-form to obtain quasiconformal mapping of the surface; and
  optimizing the quasiconformal mapping to obtain the flattened map,
  the method further comprising, after receiving the data and before computing the quasi-holomorphic 1-form:
    representing the surface of the image by a triangular mesh denoted as M=(V,E,F), where V, E, and F are vertex, edge, and face sets, respectively; and
    slicing the surface open to turn the surface M into a topological quadrilateral M', a set of landmark curves on M being denoted as $L=L^H \cup L^v$, where landmarks in $L^H$ are mapped to horizontal segments, and landmarks in $L^v$ are mapped to vertical segments, computing the quasi-holomorphic 1-form ($\omega$) of the surface comprising:
      computing two constrained harmonic functions $f_1$, $f_2$, $$\begin{cases} \Delta f_1 = 0 \\ f_1|_{l^+} = 0 \\ f_1|_{l^-} = 0 \\ \frac{\partial f_1}{\partial n}|_{\gamma_0 \cup \gamma_1} = 0 \\ f_1|_{l_j} = t_j, l_j \in L^V \end{cases}, \text{ and } \begin{cases} \Delta f_2 = 0 \\ f_2|_{\gamma_0} = 0 \\ f_2|_{\gamma_1} = 1 \\ f_2|_{\gamma_1} = 1 \\ f_2|_{l_i} = s_i, l_i \in L^H \end{cases}$$

where n is the normal vector to the boundary, and $s_i$, $t_j$ are unknown variables, computed automatically, wherein landmark curve, $l_k = [V_1, V_2, \ldots, V_{nk}]$, has two types of straightening constraints, as follows: a) Horizontal: v coordinates are same, $v(v_1)= v(v_2)=\ldots =v(v_{ni})= s_i$, b) Vertical: u coordinates are same, $u(v_1)= u(v_2)=\ldots =u(v_{ni})= t_j$, wherein the Laplace-Beltrami operator $\Delta$ can be approximated by cotangent edge weight, $\Delta f(v_i) = \Sigma_{[v_i,v_j] \in E} W_{ij}(f(v_i)-f(v_j))$, where $$w_{ij} = \frac{1}{2}(\cot\theta_{ij}^k + \cot\theta_{ij}^l),$$

$[v_i, v_j] \notin \partial M$;

$$w_{ij} = \frac{1}{2}\cot\theta_{ij}^k,$$

$[v_i,v_j] \in \partial M$; $\theta_{ij}^k$, $\theta_{ij}^l$ are the angles against edge $[v_i,v_j]$;
computing harmonic 1-forms by gradient computation, $\tau_1 = \nabla f_1$, $\tau_2 = \nabla f_2$;

computing a conjugate 1-form of $\tau_1$ by Hodge star operator, $*\tau_1=\lambda\tau_2$, where $\lambda$ is a scalar, by minimizing the energy $E(\lambda)=\Sigma_{[v_i,v_j,v_k]\in F}|\nabla f_2-\lambda n\times\nabla f_1|^2 A_{ijk}$, where $A_{ijk}$ is the area of face $[v_i,v_j,v_k]$, n is the normal vector to the face; and computing $\omega=\tau_1+\sqrt{-1}*\tau_1$, integrating the quasi-holomorphic 1-form ($\omega$) to obtain quasiconformal mapping of the surface comprising integrating the quasi-holomorphic 1-form ($\omega$) over open domain M', $f(p)=\int_{\gamma(q,p)\in M}\omega$, $\forall p\in V$ wherein $\gamma(q, p)$ is an arbitrary path from base vertex q to current vertex p, wherein on the planar domain, $f(q)=(0,0)$, $f(\gamma_i)$, $f(l_k)$ are all straight lines, and wherein a rectangle map is obtained by tracing a straight line perpendicular to boundaries $f(\gamma_i)$, and optimizing the quasiconformal mapping to obtain the flattened map comprising:

computing an initial Beltrami coefficient $\mu_0=\mu(f_0)$ by using $\partial_{\bar z}f=\mu_f(z)\partial_z f$;

diffusing $\mu_{n+1}\leftarrow\mu_n+\delta\Delta\mu_n$;

computing an intermediate quasiconformal map associated with $\mu_n$, $f^{\mu_n}$: $(D,z)\rightarrow(D^{\mu_n},\xi)$;

computing the quasiconformal map $h^{\mu_n}(D^{\mu_n}, L)\rightarrow(D, l)$;

updating $\mu_{n+1}\leftarrow\mu(h^{\mu_n}\circ f^{\mu_n})$;

repeating the steps of diffusing $\mu_{n+1}\leftarrow\mu_n+\delta\Delta\mu_n$, computing an intermediate quasiconformal map, computing the quasiconformal map, and updating, $\mu_{n+1}\leftarrow\mu(h^{\mu_n}\circ f^{\mu_n})$ unitl $\|\mu_{n+1}-\mu_n\|_\infty<\epsilon$; and obtaining the flattened map $f=h^{\mu_n}\circ f^{\mu_n}\circ f_0$.

2. The non-transitory computer-readable medium according to claim 1, wherein the image is an image of a colon obtained by virtual colonoscopy.

3. A non-transitory computer-readable medium having computer-executable instructions for performing a method for producing a flattened map of an image, the method comprising:

receiving data for a three-dimensional surface of the image, wherein the surface comprises at least one landmark curve;

converting the at least one landmark curve in preparation for computation of a quasi-holomorphic 1-form;

computing the quasi-holomorphic 1-form of the surface;

integrating the quasi-holomorphic 1-form to obtain quasiconformal mapping of the surface; and obtaining the flattened map from the quasiconformal mapping, wherein converting the at least one landmark curve in preparation for computation of a quasi-holomorphic 1-form comprises using an equation $L=\{l_k, k=1\ldots m\}$ to denote a set of the at least one landmark curve (m) on M, wherein each landmark curve is represented as a chain of vertices, $l_k=[V_1,V_2,\ldots,V_{nk}]$, where $n_k$ is a number of the vertices on $l_k$, wherein $L=L^H\cup L^V$, where $L^H$, $L^V$ are to be mapped to horizontal and vertical straight segments, respectively, wherein computing the quasi-holomorphic 1-form ($\omega$) of the surface comprises:

computing two constrained harmonic functions $f_1$, $f_2$ $$\begin{cases} \Delta f_1 = 0 \\ f_1|_{\gamma_3} = 0 \\ f_1|_{\gamma_1} = 1 \\ \frac{\partial f_1}{\partial n}\Big|_{\gamma_0\cup\gamma_2} = 0 \\ f_1|_{l_k^V} = s_k \end{cases},$$

and $$\begin{cases} \Delta f_2 = 0 \\ f_2|_{\gamma_0} = 0 \\ f_2|_{\gamma_2} = 1 \\ \frac{\partial f_2}{\partial n}\Big|_{\gamma_1\cup\gamma_3} = 0 \\ f_2|_{l_k^H} = t_k \end{cases},$$

where n is the normal vector to a boundary, $s_k$, $t_k$ are unknown variables, computed automatically for each landmark curve, wherein two type of straightening constraints are: a) Horizontal: for $l_k\in L^H$, $v(v_i)=s_k$, i=1 ... $n_k$; and b) Vertical: $l_k\in L^v$, $u(v_i)=t_k$, i=1 ... $n_k$, wherein Laplace-Beltrami operator $\Delta$ is approximated by a cotangent weight $w_{ij}$,$\Delta f(\Delta)=\Sigma_{[v_i,v_j]\in E}w_{ij}(f(v_i)-f(v_j))$, wherein two adjacent faces for edge $[v_i,v_j]$ are $[v_i,v_j,v_k]$ and $]v_j, v_i,v_l]$, wherein a weight of edge $[v_i,v_j]$ is defined as $W_{ij}=\cot\theta_k^{ij}+\cot\theta_l^{ij}$, $[v_i,v_j]\not\subset\partial M$ or $W_{ij}=\cot\theta_k^{ij}$ or $W_{ij}=\frac{1}{2}\cot\theta_k^{ij}$ $[v_i,v_j]\in\partial M$; wherein $\theta_k^{ij}$ is the corner angle at $v_k$ in $[v_i, v_j, v_k]$;

computing harmonic 1-forms by gradient computation, $\tau_1=\nabla f_1$, $\tau_2=\nabla f_2$;

computing a conjugate 1-form of $\tau_1$ by Hodge star operator, $*\tau_1=\lambda\tau_2$, where $\lambda$ is a scalar, by minimizing the energy $E(\lambda)=\Sigma_{[v_i,v_j,v_k]\in F}|\nabla f_2-\lambda n\times\nabla f_1|^2 A_{ijk}$, where $A_{ijk}$, is the area of face $[v_i, v_jv_k]$, n is the normal vector to the face $[v_i, v_j, y_k]$; and computing $\omega=\tau_1+\sqrt{-1}*\tau_1$, wherein integrating the quasi-holomorphic 1-form to obtain quasiconformal mapping of the surface comprising inteqratinq the obtained quasi-holomorphic 1-form ($\omega$) over M, $f(q)=\int_{\gamma(p,q)\in M}\omega$, $\forall q\in V$, wherein $\gamma(p, q)$ is an arbitrary path from a base vertex p to a current vertex q, and wherein on the planar domain, $f(p)=(0,0)$, $f(\gamma_i)$, $f(l_k)$ are all straight lines, and wherein a rectangle map is obtained by tracing a straight line perpendicular to boundaries $f(\gamma_i)$, and wherein obtaining the flattened map comprising optimizing the quasiconformal mapping to obtain the flattened map by performing the following steps:

computing an initial Beltrami coefficient $\mu_0=\mu(f_0)$ by using $\partial_{\bar z}f=\mu_f(z)\partial_z f$;

diffusing $\mu_{n+1}\leftarrow\mu_n+\delta\Delta\mu_n$;

computing an intermediate quasiconformal map associated with $\mu_n$, $f^{\mu_n}$: $(D,z)\rightarrow(D^{\mu_n},\xi)$;

computing the quasiconformal map $h^{\mu_n}$: $(D^{\mu_n},L)\rightarrow(D,l)$;

updating $\mu_{n+1}\leftarrow\mu(h^{\mu_n}\circ f^{\mu_n})$;

repeating the steps of diffusing $\mu_{n+1}\leftarrow\mu_n+\delta\Delta\mu_n$, computing an intermediate quasiconformal map, computing the quasiconformal map, and updating $\mu_{n+1}\leftarrow\mu(h^{\mu_n}\circ f^{\mu_n})$ unitl $\|\mu_{n+1}-\mu_n\|_\infty<\epsilon$; and obtaining the flattened map $f=h^{\mu_n}\circ f^{\mu_n}\circ f_0$.

4. The non-transitory computer-readable medium according to claim 3 wherein the method further comprises, after integrating the quasi-holomorphic 1-form to obtain quasiconformal mapping of the surface, performing an algorithm for surface matching, wherein positions and lengths of canonical-shaped landmarks of the quasiconformal mapping and conformal modules of the background domain can be used as Teichmüller coordinates to construct Teichmüller space.

5. The non-transitory computer-readable medium according to claim 4, wherein the method further comprises, after integrating the quasi-holomorphic 1-form to obtain quasi-conformal mapping of the surface, performing an algorithm for surface registration,
  wherein decorated surfaces are mapped to canonical planar domains with the at least one landmark curve, wherein the at least one landmark curve is canonically-shaped.

6. The non-transitory computer-readable medium according to claim 3, wherein the image is an image of a face, a brain, or a colon.

7. The non-transitory computer-readable medium according to claim 3, wherein the method further comprises, after integrating the quasi-holomorphic 1-form to obtain quasi-conformal mapping of the surface, performing an algorithm for surface matching,
  wherein positions and lengths of canonical-shaped landmarks of the quasiconformal mapping and conformal modules of a background domain can be used as Teichmüller coordinates to construct Teichmüller space.

8. The non-transitory computer-readable medium according to claim 3, wherein the method further comprises, after integrating the quasi-holomorphic 1-form to obtain quasi-conformal mapping of the surface, performing an algorithm for surface registration,
  wherein decorated surfaces are mapped to canonical planar domains with the at least one landmark curve, wherein the at least one landmark curve is canonically-shaped.

9. A non-transitory computer-readable medium having computer-executable instructions for performing a method for producing registration between two surfaces, wherein the two surfaces $S_k$ are decorated with landmark curves $L_k$, $k=1,2$, respectively, $f:(S_1, L_1) \to (S_2, L_2)$, based on flattened maps $\varphi_k:(S_k, L_k) \to (D_k, l_k)$, wherein the method comprises:

computing the two flattened maps $\varphi_k :(S_k, L_k) \to (D_k, l_k)$;

computing optimal mapping $h : (D_1, l_1) (D_2, l_2)$, such that straight line $l_1$, is aligned with straight line $l_2$ and the harmonic energy of the mapping, $E(h) = \int_{D_1} |\nabla \cdot \nabla h|^2 \, dA$ with the Dirichlet and Neumann boundary conditions, is minimized, $$\begin{cases} \Delta h_1 = 0 \\ h_1|_{\gamma_3^1} = \phi_2^u|_{\gamma_3^2} - \phi_1^u|_{\gamma_3^1} \\ h_1|_{\gamma_1^1} = \phi_2^u|_{\gamma_1^2} - \phi_1^u|_{\gamma_1^1} \\ \frac{\partial h_1}{\partial n}\Big|_{\gamma_0 \cup \gamma_2} = 0 \\ h_1|_{l_1^V} = \phi_2^u|_{l_2^V} - \phi_1^u|_{l_1^V} \\ h_1|_{p_1^H} = \phi_2^u|_{p_2^H} - \phi_1^u|_{p_1^H} \end{cases} \text{ and } \begin{cases} \Delta h_2 = 0 \\ h_2|_{\gamma_0^1} = \phi_2^v|_{\gamma_0^2} - \phi_1^v|_{\gamma_0^1} \\ h_2|_{\gamma_2^1} = \phi_2^v|_{\gamma_2^2} - \phi_1^v|_{\gamma_2^1} \\ \frac{\partial h_2}{\partial n}\Big|_{\gamma_1 \cup \gamma_3} = 0 \\ h_2|_{l_1^H} = \phi_2^v|_{l_2^H} - \phi_1^v|_{l_1^H} \\ h_2|_{p_1^V} = \phi_2^v|_{p_2^V} - \phi_1^v|_{p_1^V} \end{cases}$$

wherein $\nabla h = (h_1, h_2)$, $D_k$ are rectangles, $\partial D_k = \gamma_0^k + \gamma_1^k + \gamma_2^k + \gamma_3^k (\gamma_i^1, \gamma_i^2)$, $i=0 \ldots 3$ denotes a pair of corresponding boundaries, $L_k = L_k^H \cap L_k^V$, $(l_1, l_2)$, and $(p_1, p_2)$ denotes a pair of segments and endpoints to be aligned, respectively, and $h(p) = p + \nabla h(p)$, $p \in D_1$; and obtaining the registration $f = \varphi_2^{-1} \circ h \circ \varphi_1$.

* * * * *